US012760154B2

(12) United States Patent
McLoughlin et al.

(10) Patent No.: US 12,760,154 B2
(45) Date of Patent: Oct. 13, 2026

(54) MODIFYING POLYOLEFINS WITH INORGANIC SOLID PARTICLE COMPOSITIONS

(71) Applicant: BRASKEM AMERICA, INC., Philadelphia, PA (US)

(72) Inventors: Kimberly Miller McLoughlin, Pittsburgh, PA (US); Geoffrey Lyne, Pittsburgh, PA (US); Sarah Mitchell, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 742 days.

(21) Appl. No.: 18/142,245

(22) Filed: May 2, 2023

(65) Prior Publication Data

US 2023/0357516 A1 Nov. 9, 2023

Related U.S. Application Data

(60) Provisional application No. 63/337,816, filed on May 3, 2022.

(51) Int. Cl.
*C08J 3/21* (2006.01)
*C08J 11/16* (2006.01)

(52) U.S. Cl.
CPC ............... *C08J 3/212* (2013.01); *C08J 11/16* (2013.01); *C08J 2323/06* (2013.01); *C08J 2323/12* (2013.01)

(58) Field of Classification Search
USPC ........................................................... 521/47
See application file for complete search history.

(56) References Cited

U.S. PATENT DOCUMENTS

| | | | | |
|---|---|---|---|---|
| 4,552,930 | A | 11/1985 | Hirota et al. | |
| 4,962,148 | A | 10/1990 | Orikasa et al. | |
| 5,580,931 | A * | 12/1996 | Aguirre ..................... | C08F 4/42 525/274 |
| 6,322,721 | B1 | 11/2001 | Yankner et al. | |
| 2008/0173452 | A1 | 7/2008 | Sanders et al. | |
| 2010/0222454 | A1 | 9/2010 | Sala et al. | |
| 2014/0066530 | A1 | 3/2014 | Shen et al. | |
| 2014/0088214 | A1 | 3/2014 | Okamoto et al. | |
| 2017/0313865 | A1 | 11/2017 | Wang et al. | |
| 2021/0155770 | A1 | 5/2021 | Brandhorst et al. | |
| 2021/0371756 | A1 | 12/2021 | Pushkarey et al. | |
| 2022/0153883 | A1 | 5/2022 | Camilo et al. | |
| 2022/0153976 | A1 | 5/2022 | Camilo et al. | |

FOREIGN PATENT DOCUMENTS

| | | | |
|---|---|---|---|
| CN | 102603936 | A | 7/2012 |
| CN | 103668699 | A | 3/2014 |
| CN | 112358558 | A | 2/2021 |
| WO | 2019092378 | A2 | 5/2019 |
| WO | 2012/000022 | A1 | 1/2021 |
| WO | 2021080813 | A1 | 4/2021 |
| WO | 2022/101682 | A1 | 5/2022 |
| WO | 2022/101683 | A1 | 5/2022 |

OTHER PUBLICATIONS

Anh Le-Tuan Pham, Changha Lee, Fiona M. Doyle, and David L. Sedlak Environmental Science & Technology 2009 43 (23), 8930-8935 (Year: 2009).*
Lousada et al., "Mechanism of H202 Decomposition on Transition Metal Oxide Surfaces," The Journal of Physical Chemistry 116: 9533-9543 (2012).
Sobanska et al., "Generation of Reactive Oxygen Species via Electroprotic Interaction of H2O2 with ZrO2 Gel: Ionic Sponge Effect and pH-Switchable PeroxIdase- and Catalase-Like Activity" ACS Catalysis, vol. 7; 2935-2947 (2017).
Liu et al., "Preparation and properties of metal textured polypropylene composites with low odor and low VOC" Sci Eng Compos Mater, vol. 27; 445-454 (2020).
Yin et al., "Exploring the mechanism of ZrO2 structure features on H2O2 activation in Zr—Fe bimetallic catalyst" Applied Catalysis B: Environmental 299, DOI: 10.1016/j.apcatb.2021.120685 (2021).
Kuchibhatla, et al.,"Influence of Aging and Environment on Nanoparticle Chemistry: Implication to Confinement Effects in Nanoceria", The Journal of Physical Chemistry C, vol. 116, No. 26, Jun. 22, 2012, pp. 14108-14114.
Quinn, et al.,"Peroxide-Modified Titanium Dioxide: a Chemical Analog of Putative Martian Soil Oxidants",Origins of Life and Evolution of the Biosphere.,vol. 29, No. 1, Jan. 1, 1999 , pp. 59-72.
Moad et al., "Aqueous hydrogen peroxide-induced degradation of polyolefins: A greener process for controlled-rheology polypropylene", Polymer Degradation and Stability, vol. 117, Apr. 11, 2015, pp. 97-108.
Boonstra et al., "Adsorption of Hydrogen Peroxide on the Surface of Titanium Dioxide", the journal of physical chemistry, vol. 79, No. 18, Feb. 20, 1975, pp. 1940-1943.

* cited by examiner

*Primary Examiner* — Terressa Boykin
(74) *Attorney, Agent, or Firm* — Jeffrey N. Townes; Cozen O'Connor

(57) ABSTRACT

The invention relates to a process for modifying an olefin polymer composition comprising melt mixing an olefin polymer composition with a free-radical initiator composition comprising a peroxide-modified inorganic composition prepared from: i) a liquid or an aqueous hydrogen peroxide, and ii) one or more inorganic solid particles, wherein the inorganic solid particles have affinity to the hydrogen peroxide through hydrogen bonding. The invention also relates to a modified olefin polymer composition prepared by the process and various articles formed from the modified olefin polymer composition.

45 Claims, 5 Drawing Sheets

MODIFYING POLYOLEFINS WITH INORGANIC SOLID PARTICLE COMPOSITIONS

This application claims the benefit of priority to U.S. Provisional Patent Application No. 63/337,816, filed on May 3, 2022, which is herein incorporated by reference in its entirety.

FIELD OF THE INVENTION

This invention generally relates to a peroxide-modified inorganic solid particle composition for modifying polyolefins.

BACKGROUND OF THE INVENTION

Polyolefins such as polyethylene (PE) and polypropylene (PP) may be used to manufacture a wide variety of articles, including films, molded products, foams, etc. Post-polymerization modification and/or functionalization of polyolefins provide additional alternatives to generate value-added materials with wide ranging applications, such as in injection molding, fiber spinning, nonwoven fabric production, film and foam fabrication, additive manufacturing processes, and chemical recycling processes.

Reactive extrusion with free radical initiators, such as an organic peroxide, has been commonly used to modify and/or functionalize polyolefins, in order to provide polyolefins with reduced viscosity or generate functionalized or branched polyolefins. However, this process can be limited by the degree of reaction achieved by an organic peroxide initiation. For example, conventional cracking of polypropylene by an organic peroxide cannot provide sufficient viscosity reduction to recycle polyolefins to form waxes or liquid products. Increasing the concentration of the organic peroxide actually decreases the efficiency of the organic peroxide-initiated scission, in part because the peroxy radicals produced by the organic peroxide react with each other to terminate the reaction.

Moreover, conventional free radical reactions of polyolefins with an organic peroxide can generate a significant amount of volatile organic by-products. As a result, polyolefins cracked by an organic peroxide are excluded from many applications, such as food packaging and medical fabrics and devices.

While hydrogen peroxide has been used to initiate free-radical reactions of polyolefins, employing hydrogen peroxide as the free-radical initiator for modifying polyolefins can present various issues. For instance, using a high concentration of aqueous hydrogen peroxide can present safety concerns, whereas using a lower concentration of aqueous hydrogen peroxide can introduce a large amount of water into the reaction system, resulting in processing difficulties. The half-life of hydrogen peroxide is also short. It is not uncommon for hydrogen peroxide to decompose at typical extrusion temperatures used for polyolefins.

There thus remains a need in the art to develop an initiator composition with an improved efficiency and easy processability for the free-radical reaction of polyolefins; a further need in the art exists for a process of producing the initiator composition that is more environmental friendly and that minimizes the production of volatile organic by-products.

SUMMARY OF THE INVENTION

One aspect of the invention relates to a process for modifying an olefin polymer composition. The process comprises melt mixing an olefin polymer composition with a free-radical initiator composition comprising a peroxide-modified inorganic composition prepared from:

i) a liquid or an aqueous hydrogen peroxide, and ii) one or more inorganic solid particles, wherein the inorganic solid particles have affinity to the hydrogen peroxide through hydrogen bonding. The peroxide-modified inorganic composition initiates a free-radical reaction of the olefin polymer composition to produce a modified olefin polymer composition.

Another aspect of the invention relates to a modified olefin polymer composition prepared by a process comprising: melt mixing an olefin polymer composition with a free-radical initiator composition comprising a peroxide-modified inorganic composition prepared from:

i) a liquid or an aqueous hydrogen peroxide, and ii) one or more inorganic solid particles, wherein the inorganic solid particles have affinity to the hydrogen peroxide through hydrogen bonding, wherein the peroxide-modified inorganic composition initiates a free-radical reaction of the olefin polymer composition to produce a modified olefin polymer composition.

Another aspect of the invention relates to a molded article, fiber, filament, film, melt blown fabric, additive manufacture feedstock, or chemical recycling feedstock formed from the modified olefin polymer composition discussed above.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

DETAILED DESCRIPTION OF THE INVENTION

Figure 1A:
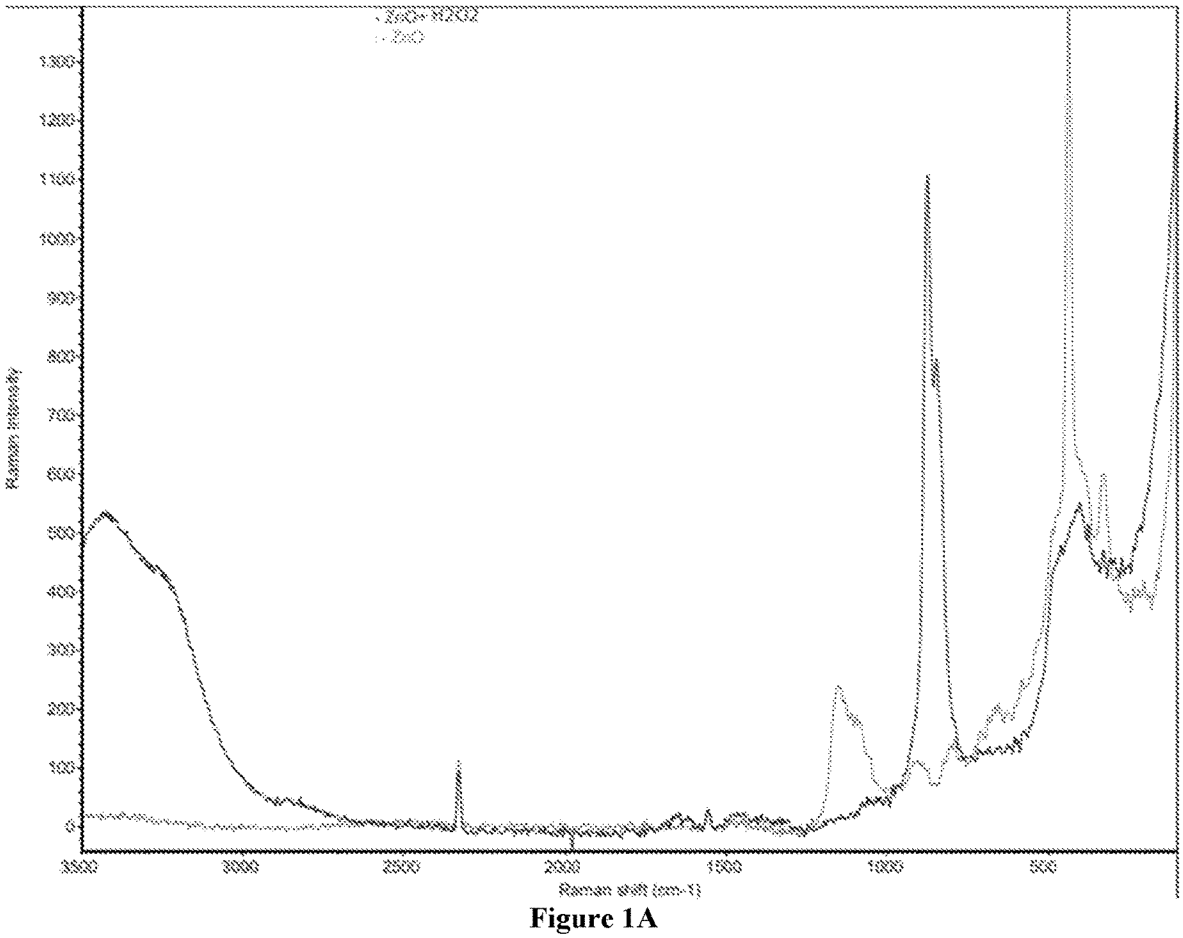
FIG. 1A shows the Raman spectra of and HOOH-modified ZnO as compared to the ZnO control.

The disclosure provides a novel, inorganic, free-radical initiator composition for modifying polyolefins. The free-radical initiator composition comprises a peroxide-modified inorganic solid particle prepared from a liquid or solution of hydrogen peroxide and one or more inorganic solid particles (such as hydrogen-peroxide modified metal oxides). The resulting peroxide-modified inorganic composition can be used in a batch or continuous (e.g., extrusion) process to initiate free-radical reactions for modifying polyolefins.

The inorganic, free-radical initiator composition containing the peroxide-modified inorganic solid particle provides a novel way to modify polyolefin compositions, such as polypropylene (PP) and polyethylene (PE) resins, in various types of reactions, depending on the reaction conditions and the types of the polyolefin compositions to be modified. For instance, the peroxide-modified inorganic solid particle can promote effective chain scission of the polyolefins to control rheology and reduce the melt viscosity of polyolefins, especially recycled polyolefin resins (e.g., recycled PP and recycled PE). This process can generate value-added polymer products, such as polyolefins with low viscosity and narrow molecular weight distribution, suitable for a wide variety of applications, such as in injection molding, fiber spinning, nonwoven fabric production, additive manufacturing processes, and chemical recycling processes. The peroxide-modified inorganic solid particle can also promote effective crosslinking or branching reactions for the polyolefins at lower temperatures. With the use of additional grafting agents, the peroxide-modified inorganic solid particle can also promote functionalization of the polyolefin and further crosslinking reactions. These processes also have well-known industrial applications such as in fabricating films, molded articles, fiber articles, foams, wire cable, profile extrusion, and packaging materials, and in automotive applications.

The Peroxide-Modified Inorganic Solid Particles

One aspect of the invention relates to a free-radical initiator composition for polyolefin modification comprising a peroxide-modified inorganic solid particle prepared from:

i) a liquid or solution of hydrogen peroxide, and ii) one or more inorganic solid particles, wherein the inorganic solid particles have affinity to the hydrogen peroxide through hydrogen bonding.

Another aspect of the invention relates to a method for preparing a peroxide-modified inorganic composition. The method comprises mixing a liquid or solution of hydrogen peroxide and one or more inorganic solid particles to form a suspension or gel, and optionally, filtering the suspension or gel and drying the filtered materials to form a solid, peroxide-modified inorganic composition.

The peroxide used is a liquid or a solution of hydrogen peroxide. It may be a hydrogen peroxide solution prepared by dissolving hydrogen peroxide in a solvent (e.g., water). Hydrogen peroxide may be obtained commercially.

The peroxide-modified inorganic solid particle may be prepared by mixing the hydrogen peroxide and one or more inorganic solid particles. Mixing can occur in the presence or absence of a solvent. In one embodiment, the hydrogen peroxide is used as a liquid. In some embodiments, the hydrogen peroxide source is in solid or liquid form, and the hydrogen peroxide used is a solution prepared by dissolving hydrogen peroxide in a solvent. The solvent is typically water. Other suitable solvents include, but are not limited to, deep eutectic solvents, eutectic mixtures, ionic liquids, dimethyl carbonate (green solvents), methanol, ethanol, isopropanol, ethylene glycol, glycerol, and combinations thereof. Typically, the hydrogen peroxide used is an aqueous solution of hydrogen peroxide.

Mixing the liquid or solution of hydrogen peroxide and one or more inorganic solid particle can form a suspension or gel, which may be used directly in the subsequent process (e.g., batch or continuous process) to modify polyolefin. Alternatively, the suspension or gel may be filtered and dried to form a solid, peroxide-modified inorganic composition, for use in the subsequent process (e.g., batch or continuous process) to modify polyolefin.

In one embodiment, the hydrogen peroxide is an aqueous hydrogen peroxide. The pH of the aqueous hydrogen peroxide can be neutral (for instance, a pH of about 7) or acidic (for instance, a pH of lower than 7). An acid (e.g., an inorganic acid such as HCl) or base (e.g., sodium or potassium hydroxide) may be added to the aqueous hydrogen The concentration of hydrogen peroxide solution used may vary widely. High concentrations of hydrogen peroxide (e.g., greater than about 60 vol %) can be effective, but may present safety concerns. Suitable concentrations of hydrogen peroxide can range from about 0.1 wt % to about 70 wt %, based on the total weight of the hydrogen peroxide solution, e.g., from about 1 wt % to about 70 wt % (4-62% vol %), from about 5 wt % to about 70 wt %, from about 10 wt % to about 70 wt %, from about 20 wt % to about 70 wt %, from about 30 wt % to about 70 wt %, from about 30 wt % to 60 wt %, from about 30 wt % to 50 wt %, from about 0.1 wt % to about 30 wt %, from about 1 wt % to about 30 wt %, from about 5 wt % to about 30 wt %, from about 10 wt % to about 30 wt %, or from about 20 wt % to about 30 wt %.

The hydrogen peroxide is provided with one or more inorganic solid particles to prepare an inorganic free-radical initiator composition. Conventionally, hydrogen peroxide can be used by itself to initiate free-radical reactions of polyolefins. However, as discussed above, employing hydrogen peroxide by itself as the free-radical initiator for modifying polyolefins can present various issues. In this disclosure, one or more inorganic solid particles are employed as a support for hydrogen peroxide. The inorganic solid particles have affinity to the hydrogen peroxide through hydrogen bonding, and the hydrogen peroxide associates with the inorganic solid particles by reacting with the inorganic solid particles and/or adsorbing on the surface of the inorganic solid particles.

Without being bound by theory, it is believed that when the hydrogen peroxide is mixed with and/or associates to the inorganic solid particles, it may be decomposing on the surface of the inorganic particles to generate hydroxyl radicals. For instance, hydrogen peroxide may be adsorbing onto the surface of the inorganic solid particles upon mixing and dissociating to form hydroxyl radicals, which are then stabilized by interaction with the inorganic solid particles. When the final hydrogen-peroxide modified inorganic solid particles are used to modify polyolefins, upon heating, the hydroxyl radicals may desorb from the surface of the inorganic solid particles to participate in reactions with polymers. The rate of decomposition and the lifetime of the radicals are dependent on the environment of the reaction system, e.g., the solvent and pH. Changing the solvent, the concentration, and/or adjusting the pH of the solution can help control the kinetics of the reaction system.

Without being bound by theory, the hydrogen peroxide may react with metal oxide (e.g., zinc oxide) to result in an initiator that contains some or mostly metal peroxide (e.g., zinc peroxide), as characterized by XRD (X-ray diffraction).

The inorganic solid particles can be in powder or pellet form, e.g., free-flowing powders or pellets. The inorganic solid particles are in free-flowing form, rather than in paste form, so as to be utilized in solids handling equipment (e.g., being fed directly to an extruder). In one embodiment, the inorganic solid particles have a flowability of less than about 60 s/50 g).

Suitable inorganic solid particles are those having affinity to the hydrogen peroxide through hydrogen bonding.

The inorganic solid particles can have an average diameter of about 1 nm or above. For instance, the inorganic solid particles can have an average diameter ranging from about 1 nm to about 100 μm, from about 1 nm to about 50 μm, from about 1 nm to about 10 μm, from about 1 nm to about 1 μm, from about 1 nm to about 500 nm, from about 1 nm to about 400 nm, from about 1 nm to about 300 nm, from about 1 nm to about 200 nm, from about 1 nm to about 100 nm, from about 10 nm to about 100 nm, from about 1 nm to about 50 nm, or from about 1 nm to about 10 nm. In some embodiments, the inorganic solid particles are inorganic nanoparticles ranging from about 1 nm to about 100 nm.

The inorganic solid particles may be metal oxides, metal salts, metalloids, silicon based materials, graphene or graphene oxide, inorganic persalts, clays, minerals, or combinations thereof. The inorganic solid particles may contain a mixture of two or more different materials within the same type (e.g., two or more different metal oxides) or two or more different materials with different types (e.g., one metal oxide and one metal salt).

In some embodiments, the inorganic solid particles are one or more metal oxides. The metal(s) in the metal oxides may be selected to adjust the concentration of hydroxyl radicals adsorbed to the surface of the metal oxides and to adjust the kinetics of the reactive steps, including e.g., adsorption, dissociation, and stabilization of the radicals, and subsequent free-radical reaction with the polymer. For instance, the metal(s) in the metal oxides may be an alkali metal, an alkaline earth metal, a transition metal, lanthanide metal, or combinations thereof. When referring to particular metal(s) of the metal oxides, it is meant to include the oxides of the metal(s) in various metal-oxygen ratios that are appropriate to the particular type(s) of the metal(s). For instance, when a manganese oxide is referred to, it is meant to include all forms of manganese oxides in various metal-oxygen ratios appropriate to the particular type(s) of manganese, including MnO, $Mn_3O_4$, $Mn_2O_3$, $MnO_2$, $MnO_3$, $Mn_2O_7$, $Mn_5O_8$, $Mn_7O_{12}$, and $Mn_7O_{13}$.

Suitable metal oxides may be single metal oxides or mixed metal oxides containing more than one metallic elements in the metal oxides. The metal oxides may also be a mixture of two or more different metal oxides. These mixed metals and mixtures of metal oxides may be used to adjust the concentration of hydroxyl radicals adsorbed to the surface of the metal oxides and to adjust the kinetics of the reactive steps.

In some embodiments, the metal oxide may be a zinc oxide, titanium oxide, cerium oxide, zirconium oxide, yttrium oxide, nickel oxide, iron oxide, copper oxide, magnesium oxide, bismuth oxide, aluminum oxide, molybdenum oxide, tungsten oxide, niobium oxide, vanadium oxide, cobalt oxide, or combinations thereof.

In some embodiments, the metal oxide is a mixed metal oxide containing more than one metallic element in the metal oxides. For instance, the metal oxide may be a redox-mixed metal oxide that are oxides of first-row transition metal (such as Fe, Cu, Co, Cr, Ni, and Mn), perovskites, or mixtures thereof. Exemplary perovskites include those of the formula $AMnO_4$ or $AFeO_3$, wherein A is Ca, Sr, Ba, La, other lanthanides, or a combination thereof. Exemplary perovskites also include those of the formula of $ABO_3$, wherein the A and B sites of the perovskite are partially substituted with dopants including but not limited to compounds of the formula $Ca_xA_{1-x}Mn_yB_{1-y}O_3$, wherein A=Sr, Ba, La, Sm, or Pr; and B=Ti, Fe, Mg, Co, Cu, Ni, V, Mo, Ce, or Al. Exemplary perovskites can additionally include non-stoichiometric perovskite, such as the Ruddlesden-Popper phases of the formula $A_{n+1}B_nO_{3n+1}$, a Brownmillerite ($A_2B_2O_5$), a Spinel ($AB_2O_4$), and or a cubic ($A_{1-x}B_xO_2$), wherein A is Ca, Sr, Ba, La, other lanthanides, or a combination thereof. Exemplary oxides of first-row transition metal are $MnO_2$, $Mn_2O_3$, $Mn_3O_4$, or MnO; and optionally an oxide containing one or more of manganese, lithium, sodium, boron, and magnesium (e.g., $NaB_2Mg_4Mn_2O_4$, $NaB_2Mn_2Mg_4O_{11.5}$, $Mg_6MnO_8$, $NaMn_2O_4$, $LiMn_2O_4$, $Mg_3Mn_3B_2O_{10}$, $Mg_3(BO_3)_2$). Additional exemplary oxides of the first-row transition metal are $MnFe_2O_4$ and mixed oxides or oxide mixtures of the general form(s) $(Mn, Fe)_2O_3$ or $(Mn, Fe)_3O_4$.

In some embodiments, the inorganic solid particles comprises one or more metal oxides, and further comprise one or more additional inorganic solid particles selected from the group consisting of metal oxides, metal salts, metalloids, silicon based materials (e.g., silicon, silica, metal silicide, silane, silicate), graphene or graphene oxide, inorganic persalts, clays, minerals, and combinations thereof.

The metal salts may be used in place of metal oxides or in addition to the metal oxides. The metal(s) in the metal salts may be an alkali metal, an alkaline earth metal, a transition metal, lanthanide metal, or combinations thereof. The anionic species of the metal salt is also not particularly limited. Exemplary anionic species are salts of carboxylic acid, carbonic acid, hydrogencarbonic acid, phosphoric acid, phosphorous acid, hydrogenphosphoric acid, and boric acid.

Suitable inorganic persalts include, but are not limited to, a metal perborate, metal percarbonate, metal persulfate, metal perchlorate, metal perphosphate, or combinations thereof. The metal(s) in the metal salts may be an alkali metal, an alkaline earth metal, a transition metal, lanthanide metal, or combinations thereof.

In certain embodiments, the inorganic solid particles contain an additional metal component. Suitable metal component may be an alkali metal, an alkaline earth metal, a transition metal, a lanthanide metal, or mixtures thereof. For instance, the metal component may be nickel, cobalt, cerium, zinc, titanium, zirconium, yttrium, iron, copper, magnesium, bismuth, aluminum, molybdenum, tungsten, niobium, vanadium, or mixtures thereof.

When associating the hydrogen peroxide with the inorganic solid particle to form the inorganic, free-radical initiator composition, the weight ratio of the hydrogen peroxide to inorganic solid particle (e.g., a method oxide) can range from about 10:1 to about 1:10, for instance, from about 8:1 to about 1:8, from about 5:1 to about 1:5, from about 3:1 to about 1:3, or from about 2:1 to about 1:2.

The free-radical initiator composition may further comprise an additional inorganic peroxide. In some embodiments, the inorganic peroxide is a metal peroxide or metal persalt.

In one embodiment, the inorganic peroxide is a metal peroxide selected from the group consisting of an alkali metal peroxide, an alkaline earth metal peroxide, a transition metal peroxide, a lanthanide metal peroxide, and combinations thereof.

In one embodiment, the inorganic peroxide is an inorganic persalt selected from the group consisting of a metal perborate, a metal percarbonate, a metal persulfate, a metal perchlorate, a metal perphosphate, and combinations thereof.

In some embodiments, the peroxide-modified inorganic solid particle is used to replace organic peroxides, such as dimethylditertbutylperoxyhexane (known as Luperox 101 or Trigonox 101), in a free-radical initiator composition to provide controlled rheology of polyolefin in a batch or continuous (e.g., extrusion) process, while providing a more environmental friendly solution by minimizing the production of volatile organic by-products when being used to initiate reactions of polyolefin. In one embodiment, the free-radical initiator composition does not contain an organic peroxide.

In one embodiment, the free-radical initiator composition further comprises at least one organic peroxide. Suitable organic peroxides include a cyclic ketone peroxide, a dialkyl peroxide, a monoperoxycarbonate, poly (t-butyl) peroxycarbonates polyether, a di-peroxyketal, a perester, and mixtures thereof. In some embodiments, the organic peroxide is a cyclic ketone peroxide, a dialkyl peroxide, or a mixture thereof. Exemplary organic peroxides are 3-hydroxy-1,1-dimethylbutyl peroxyneodecanoate, α-cumyl peroxyneodecanoate, 2-hydroxy-1,1-dimethylbutyl peroxyneoheptanoate, α-cumyl peroxyneoheptanoate, t-amyl peroxyneodecanoate, t-butyl peroxyneodecanoate, di(2-ethylhexyl) peroxydicarbonate, di(n-propyl) peroxydicarbonate, di(sec-butyl)peroxydicarbonate, t-butyl peroxyneoheptanoate, t-amyl peroxypivalate, t-butyl peroxypivalate, diisononanoyl peroxide, didodecanoyl peroxide, 3-hydroxy-1,1-dimethylbutylperoxy-2-ethylhexanoate, didecanoyl peroxide, 2,2'-azobis(isobutyronitrile), di(3-carboxypropionyl) peroxide, 2,5-dimethyl-2,5-di(2-ethylhexanoylperoxy) hexane, dibenzoyl peroxide, t-amylperoxy 2-ethylhexanoate, t-butylperoxy 2-ethylhexanoate, t-butyl peroxyisobutyrate, t-butyl peroxy-(cis-3-carboxy)propenoate, 1,1-di(t-amylperoxy)cyclohexane, 1,1-di(t-butylperoxy)-3,3,5-trimethylcyclohexane, 1,1-di(t-butylperoxy) cyclohexane, OO-t-amyl O-(2-ethylhexyl) monoperoxycarbonate, OO-t-butyl O-isopropyl monoperoxycarbonate, O-t-butyl O-(2-ethylhexyl) monoperoxycarbonate, polyether tetrakis(t-butylperoxycarbonate), 2,5-dimethyl-2,5-di(benzoylperoxy) hexane, t-amyl peroxyacetate, t-amyl peroxybenzoate, t-butyl peroxyisononanoate, t-butyl peroxyacetate, t-butyl peroxybenzoate, di-t-butyl diperoxyphthalate, 2,2-di(t-butylperoxy)butane, 2,2-di(t-amylperoxy)propane, n-butyl4, 4-di(t-butylperoxy)valerate, ethyl 3,3-di(t-amylperoxy)butyrate, ethyl 3,3-di(t-butylperoxy)butyrate, dicumyl peroxide, α,α'-bis(t-butylperoxy) diisopropylbenzene, 2,5-dimethyl-2,5-di(t-butylperoxy) hexane, di(t-amyl) peroxide, t-butyl α-cumyl peroxide, di(t-butyl) peroxide, 2,5-dimethyl-2,5-di(t-butylperoxy)-3-hexyne, dicetil peroxi-dicarbonato, 3,6,9-triethyl-3,6,9-trimethyl-1,4,7-triperoxonane, tert-butylperoxy 2-ethylhexyl carbonate, tert-butyl-peroxide n-butyl fumarate(benzoate), dimyristoyl peroxydiicarbonate, 3,3,5,7,7-pentamethyl-1,2,4-trioxepane, tert-butyl hydroperoxide, bis(4-t-butylcyclohexyl) peroxydicarbonate, and 1,2,4,5,7,8-hexoxonane,3,6,9-trimethyl-3,6,9-tris(ethyl and propyl derivatives).

In some embodiments, the free-radical initiator composition may further comprise a metal stearate. Exemplary metal stearates are zinc stearate, tin stearate, iron (II) stearate, iron (III) stearate, cobalt stearate, manganese stearate, and combinations thereof.

Use of the Peroxide-Modified Inorganic Solid Particles for Modifying Polyolefin

Another aspect of the invention relates to a process for modifying an olefin polymer composition. The process comprises melt mixing an olefin polymer composition with a free-radical initiator composition comprising a peroxide-modified inorganic composition prepared from:

i) a liquid or an aqueous hydrogen peroxide, and
ii) one or more inorganic solid particles, wherein the inorganic solid particles have affinity to the hydrogen peroxide through hydrogen bonding. The peroxide-modified inorganic composition initiates a free-radical reaction of the olefin polymer composition to produce a modified olefin polymer composition.

Olefin Polymer Composition

The olefin polymer composition may be a petroleum-based resin (e.g., petroleum-based virgin resin), bio-based resin, recycled resin, or combinations thereof. For instance, the olefin polymer composition may comprise a virgin resin, a recycled resin, or combinations thereof. In some embodiments, the olefin polymer composition may comprise a combination of a recycled resin, biobased resin, and optionally a petroleum-based resin such that the resulting composition achieves low or neutral carbon emission (or even a carbon uptake).

The recycled resin may comprise a post-consumer resin (PCR), a post-industrial resin (PIR), or combinations thereof, including regrind, scraps and defective articles. PCR refers to resins that are recycled after consumer use, whereas PIR refers to resins that are recycled from industrial materials and/or processes (for example, cuttings of materials used in making other articles). The recycled resin may include resins having been used in rigid applications (such as from blow molded articles, including 3D-shaped articles) as well as in flexible applications (such as from films). The recycled resin may be of any color, including, but not limited to, black, white, or grey, depending on the color used in the ultimate article. The form of the recycled resin is not particularly limited, and may be in pellets, flakes, and agglomerated films. In some embodiments, the recycled resin used is a PCR or PIR that comprises one or more polyolefins. In some embodiments, the recycled resin is a recycled material according to ISO 14021.

The olefin polymer composition comprises a propylene-based polymer, an ethylene-based polymer, an ethylene-vinyl ester polymer, a $C_4$-$C_{12}$ olefin-based polymer, a styrene-based polymer, polyacrylate, or combinations thereof.

The propylene-based polymer contained in the olefin polymer composition can be a homopolymer, random copolymer, heterophasic copolymer, random heterophasic copolymer, terpolymer, or combinations thereof. Suitable comonomers for polymerizing with propylene, to form the propylene-based copolymer, include but are not limited to an olefin (e.g., an α-olefin) and a monomer having at least two double bonds.

The ethylene-based polymer contained in the olefin polymer composition can be low-density polyethylene (LDPE), linear low-density polyethylene (LLDPE), high-density polyethylene (HDPE), medium-density polyethylene (MDPE), polyethylene wax, ultrahigh-molecular weight polyethylene, ethylene copolymer, and combinations thereof. The ethylene copolymer can comprise at least one olefinic comonomer. Suitable comonomers for polymerizing with ethylene to form the ethylene copolymer include, but are not limited to, an olefin (e.g., an α-olefin) and a monomer having at least two double bonds.

Exemplary olefins are linear, branched, or cyclic olefins (e.g., α-olefins) having 2 to 20 carbon atoms, 2 to 16 carbon atoms, or 2 to 12 carbon atoms, including but not limited to ethylene, propylene, 1-butene, 2-butene, 1-pentene, 3-methyl-1-butene, 1-hexene, 4-methyl-1-pentene, 3-methyl-1-pentene, 1-heptene, 4-methyl-1-hexene, 5-methyl-1-hexene, 4,6-dimethyl-1-heptene, 1-octene, 1-nonene, 1-decene, 1-undecene, 1-dodecene, 1-tetradecene, 1-hexadecene, 1-octadecene, 1-eicocene, vinylcyclohexane, styrene, tetracyclododecene, norbornene, 5-ethylidene-2-norbornene (ENB), and combinations thereof. Ethylene and styrene are considered α-olefins in this disclosure.

Exemplary monomers having at least two double bonds are dienes or trienes comonomers, including but not limited to butadiene (e.g., 1,3-butadiene); pentadienes (e.g., 1,3-pentadiene; 1,4-pentadiene; 3-methyl-1,4-pentadiene; 3,3-dimethyl-1,4-pentadiene); hexadienes (e.g., 1,3-hexadiene; 1,4-hexadiene; 1,5-hexadiene; 4-methyl-1,4-hexadiene; 5-methyl-1,4-hexadiene; 3-methyl-1,5-hexadiene; 3,4-dimethyl-1,5-hexadiene); heptadienes (e.g., 1,3-heptadiene; 1,4-heptadiene; 1,5-heptadiene; 1,6-heptadiene; 6-methyl-1,5-heptadiene); octadienes (e.g., 1,3-octadiene; 1,4-octadiene; 1,5-octadiene; 1,6-octadiene; 1,7-octadiene; 7-methyl-1,6-octadiene; 3,7-dimethyl-1,6-octadiene; 5,7-dimethyl-1,6-octadiene); nonadienes (e.g., 1,8-nonadiene); decadienes (e.g., 1,9-decadiene); undecadienes (e.g., 1,10-undecadiene); dicyclopentadienes; octatrienes (e.g., 3,7,11-trimethyl-1,6, 10 octatriene); and combinations thereof.

The ethylene-vinyl ester polymers contained in the olefin polymer composition may be any polymer that includes an ethylene comonomer and one or more vinyl ester comonomers. Suitable vinyl ester comonomers include aliphatic vinyl esters having 3 to 20 carbon atoms (e.g., 4 to 10 carbon atoms or 4 to 7 carbon atoms). Exemplary vinyl esters are vinyl acetate, vinyl formate, vinyl propionate, vinyl valerate (e.g., the vinyl ester of versatic acid, vinyl neononanoate, or vinyl neodecanoate), vinyl butyrate, vinyl isobutyrate, vinyl pivalate, vinyl caprate, vinyl laurate, vinyl stearate, and vinyl versatate. Aromatic vinyl esters such as vinyl benzonate can also be used as vinyl ester comonomers. These vinyl ester comonomers can be used alone or in combination of two or more different ones. In one embodiment, the ethylene-vinyl ester polymer is ethylene-vinyl acetate (EVA).

The $C_4$-$C_{12}$ olefin-based polymers contained in the olefin polymer composition are homopolymers or copolymers based on $C_4$-$C_{12}$ olefin monomer. Exemplary $C_4$-$C_{12}$ olefin-based polymers are, butylene-based polymers, 4-methyl-1-pentene based polymers, 3-methyl-1-butene based polymers, and hexene-based polymers.

Suitable styrene-based polymer includes but are not limited to polymers prepared from monomers such as styrene, α-methylstyrene, p-methylstyrene, vinylxylene, vinylnaphthalene, and mixtures thereof, and optionally a diene comonomer such as butadiene, isoprene, pentadiene, and mixtures thereof.

The olefin polymer composition can comprise a propylene-based polymer, an ethylene-based polymer, or a combination thereof in an amount of from about 40 wt % to about 100 wt %, relative to 100 wt % of the olefin polymer composition. For instance, the propylene-based polymer, ethylene-based polymer, or a combination thereof may be present in the olefin polymer composition in an amount of at least about 51 wt %, at least about 60 wt %, at least about 70 wt %, at least about 75 wt %, at least about 80 wt %, at least about 85 wt %, at least about 90 wt %, or at least about 95 wt %, relative to 100 wt % of the olefin polymer composition.

In some embodiments, the olefin polymer composition comprises at least 51 wt % of a propylene-based polymer, an ethylene-based polymer, or a combination thereof.

The olefin polymer composition may further comprise a polyamide, nylon, ethylene-vinyl alcohol (EVOH), polyester, or combinations thereof.

Suitable polyamides include aliphatic polyamides such as nylon-6, nylon-66, nylon-10, nylon-12 and nylon-46; and aromatic polyamides produced from aromatic dicarboxylic acid and aliphatic diamine.

Suitable polyesters include but are not limited to polyethylene terephthalate, polybutylene terephthalate, polyethylene naphthalate, polybutylene naphthalate, polyethylene isophthalate, polycarbonate, copolymerization of polyesters with ethylene terephthalate as a main repeating unit (such as polyethylene(terephthalate/isophthalate), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene(terephthalate/decane dicarboxylate)), and copolymerization of polyesters with a butylene terephthalate as a main repeating unit (such as polybutylene(terephthalate/isophthalate)), polybutylene(terephthalate/adipate), polybutylene(terephthalate/sebacate), polybutylene(terephthalate/decane dicarboxylate)).

Modification of the Olefin Polymer Composition

The olefin polymer composition is modified by the free-radical initiator composition comprising the peroxide-modified inorganic composition as discussed above.

All above descriptions and all embodiments discussed in the above aspects relating to the free-radical initiator composition and the method for preparing a peroxide-modified inorganic composition, including various aspects of the peroxide-modified inorganic solid particle; the hydrogen peroxide and its concentration; various types of the inorganic solid particles and their sizes and amounts; the association of hydrogen peroxide and the inorganic solid particles to form the peroxide-modified inorganic solid particle; and additional components in the free-radical initiator composition are applicable to this aspect of the invention relating to a process for modifying an olefin polymer composition.

The free-radical initiator composition may be added in an amount ranging from a lower limited selected from about 0.01 wt %, about 0.05 wt %, about 0.1 wt %, about 0.2 wt %, about 0.5 wt %, about 1%, about 1.5 wt %, and about 2 wt %, to an upper limit selected from about 2.5 wt %, about 3 wt %, about 4 wt %, about 5 wt %, about 10 wt %, about 10 wt %, and about 15 wt %, relative to the weight of the olefin polymer composition, in which any lower limit can be used with any upper limit for the amount range. For instance, the free-radical initiator composition may added in an amount ranging from about 0.01 wt % to about 15 wt %. In one embodiment, the free-radical initiator composition is added in an amount ranging from about 0.01 wt % to about 10 wt %. In one embodiment, the free-radical initiator composition is added in an amount ranging from about 0.01 wt % to about 5 wt %.

The modification of the olefin polymer composition with the free-radical initiator composition involves heating the olefin polymer composition with the free-radical initiator composition to a temperature to decompose the hydrogen peroxide on the surface of the inorganic solid particles. The free radicals released from the peroxide-modified inorganic composition contained in the free-radical initiator composition can initiate the free-radical reaction of the olefin polymer composition to produce a modified olefin polymer composition.

Depending on the reaction conditions, heating the olefin polymer composition with the peroxide-modified inorganic solid particles can initiate various types of reactions to modify the olefin polymer compositions, such as chain scission reaction (i.e., vis-breaking), crosslinking or branching reaction, or grafting reaction.

In some embodiments, the modification of the olefin polymer composition with the free-radical initiator composition comprises melt mixing the olefin polymer composition with the free-radical initiator composition. The melt mixing step of the process is carried out at a temperature that decomposes the hydrogen peroxide on the surface of the inorganic solid particles. In some embodiments, the melt mixing step is carried out at a temperature above the melting point of the olefin polymer composition.

The type of the reactions that occur during heating (e.g., the melt mixing step) depends on the reaction conditions, e.g., extrusion temperature, and the specific type of the olefin polymers. For instance, in the case of an ethylene-based polymer, the peroxide-modified inorganic composition promotes crosslinking and/or branching reactions at lower temperatures and chain scission reactions at higher temperatures. In the case of the propylene-based polymer, the peroxide-modified inorganic compositions are typically effective chain scission promoters, to reduce the viscosity of the propylene-based polymer to provide improved processing performance.

In some embodiments, the modification reaction is a chain scission reaction (i.e., vis-breaking or controlled rheology). The heating (e.g., the melt mixing step) is carried out at a temperature wherein a chain scission reaction occurs, producing the modified olefin polymer composition having a reduced melt viscosity (controlled rheology), and/or reduced molecular weight. The resulting modified olefin polymer composition can have a lower viscosity than the un-modified olefin polymer composition. By this process, the use of the peroxide-modified inorganic composition in combination with controlled temperatures can control the extent of the polymer's molecular backbone scission.

In some embodiments, the olefin polymer composition comprises at least 51 wt % of a propylene-based polymer, an ethylene-based polymer, or a combination thereof, and the heating (e.g., the melt mixing step) is carried out at a temperature at about 350° C. or greater. At this temperature range, the peroxide-modified metal oxide can promote the chain scission reaction for both a propylene-based polymer and an ethylene-based polymer. This can be helpful in using the process as a pre-treatment for chemical recycling of mixed waste streams of PP and PE.

For a propylene-based polymer, when being heated with the peroxide-modified inorganic composition, chain scission reactions can occur at about 170° C. and above. In some embodiments, the olefin polymer composition comprises at least 51 wt % of a propylene-based polymer, and the heating (e.g., the melt mixing step) may be carried out at a temperature at about 170° C. or greater, for instance a temperature ranging from about 170° C. to about 400° C., from about 170° C. to about 350° C., from about 170° C. to about 300° C., from about 170° C. to about 250° C., from about 170° C. to about 230° C., from about 170° C. to about 200° C., or from about 180° C. to about 200° C. The temperature is typically based on the melting temperature at the extruder die.

For an ethylene-based polymer, when being heated with the peroxide-modified inorganic composition, chain scission reactions can occur at about 350° C. and above. In some embodiments, the olefin polymer composition comprises at least 51 wt % of an ethylene-based polymer, and the heating (e.g., the melt mixing step) is carried out at a temperature at about 350° C. or greater. As with the propylene-based polymer, the temperature is typically based on the melting temperature at the extruder die.

In some embodiments, the modification reaction is a crosslinking or branching reaction. The heating (e.g., melt mixing step) is carried out at a temperature wherein a crosslinking or chain branching reaction occurs, producing the modified olefin polymer composition having a cross-linked polymer chains and/or long branched chains.

For an ethylene-based polymer, when being heated with the peroxide-modified inorganic composition, crosslinking and/or branching reactions can occur when the temperature is lower than 350° C. In some embodiments, the olefin polymer composition comprises at least 51 wt % of an ethylene-based polymer, and the heating (e.g., the melt mixing step) is carried out at a temperature lower than about 350° C., for instance a temperature at about 300° C. or lower, or at about 250° C. or lower.

In some embodiments, the modification reaction is a grafting reaction. The grafting reaction can be used to produce functional polymers. The functional polymers may be reactive polymers that may undergo further process steps for further reactions. For example, the modification process may occur in the presence of a silane group to generate a silane-modified polyolefin. The silane group is hydrolysable, and the polymer functionalized with a silane group can further react in the presence of water to generate a modified crosslinked polymer.

For a grafting reaction, the process may further comprise, prior to or during the heating (e.g., the melt mixing step), adding a grafting agent, such as a compound having one or more functional groups selected from the group consisting of carboxyl, anhydride, epoxy, hydroxyl, amino, amide, imide, ester, silane, alkoxysilane, acid halide group, aromatic ring, nitrile group, and combinations thereof.

Additionally, for a grafting reaction, the process may further comprise, prior to or during the heating (e.g., the melt mixing step), adding an additional polymer composition selected from the group consisting of a propylene-based polymer, an ethylene-based polymer, an ethylene-vinyl ester polymer, a $C_4$-$C_{12}$ olefin-based polymer, a styrene-based polymer, and combinations thereof.

In these embodiments, the heating (e.g., the melt mixing step) is carried out at a temperature wherein a grafting reaction occurs, producing the modified olefin polymer composition having functional groups or additional polymeric units grafted onto the polymer chains.

As discussed in the above embodiments, the peroxide-modified inorganic solid particle in the free-radical initiator composition is used to replace organic peroxides (such as dimethylditertbutylperoxyhexane (known as Luperox 101 or Trigonox 101)) as the free-radical initiator composition, so that the free-radical initiator composition does not need to contain an organic peroxide. Thus, in some embodiments, the process eliminate the needs for an organic peroxide. As a result, the process minimizes the generation of volatile, organic by-product.

The modification of the olefin polymer composition with the free-radical initiator composition may be carried out in a batch process or a continuous process.

The heating (e.g., melt mixing) may be conducted in a batch process. Alternatively, the heating (e.g., melt mixing) may be conducted in a continuous process, such as in an extrusion. In some embodiments, the process involves melt mixing a polyolefin composition with a free-radical initiator composition comprising a peroxide-modified inorganic composition, and extruding the melt through a die. The melting mixing step may be repeated for two or more times. In some embodiments, the process may involve multiple (more than two) melting mixing steps in series, which may be sequential or not, in a same or different facility. In embodiments where multiple melting mixing steps are performed, each step may be performed under conditions that are the same as, or different from, one another. In some embodiments, the repeated melting mixing steps are performed in a continuous loop system. The "continuous loop system" mean a system wherein the polymer composition enters in a melting mixing apparatus (e.g., an extruder), is processed, and returned to the same apparatus.

There is no particular limitation on how the peroxide-modified inorganic composition is introduced during melt mixing, provided that it makes contact with the polymer to carry out the reaction. The peroxide-modified inorganic composition may be in a suspension or gel form, which may be mixed directly with the polymer. Alternatively, the suspension or gel may be filtered and dried to form a solid, peroxide-modified inorganic composition, which is mixed with the polymer.

The extrusion can be carried out by means known in the art using an extruder or other vessel apparatus. The term "extruder" takes on its broadest meaning and, includes any machine suitable for the polymer extrusion. For instance, the term includes machines that can extrude the polymer composition in the form of powder or pellets, rods, strands, fibers or filaments, sheets, or other desired shapes and/or profiles. Generally, an extruder operates by feeding the polymer composition through the feed throat (an opening near the rear of the barrel) which comes into contact with one or more screws. The rotating screw(s) forces the polymer material forward into one or more heated barrels (e.g., there may be one screw per barrel). In many processes, a heating profile can be set for the barrel in which three or more independent proportional-integral-derivative controller (PID)-controlled heater zones can gradually increase the temperature of the barrel from the rear (where the plastic enters) to the front.

The vessel can be, for instance, a single-screw, twin-screw, or multi-screw extruder, or a batch mixer. For instance, a batch mixer is used for a batch process. Typically, a twin-screw extruder is used for a continuous extrusion process. Further descriptions about extruders and processes for extrusion can be found in U.S. Pat. Nos. 4,814,135; 4,857,600; 5,076,988; and 5,153,382; all of which are incorporated herein by reference.

In some embodiments, the melt mixing step is carried out at a residence time of 2 minutes or less, for instance, less than 90 s.

The process may further comprise one or more cleaning steps. The cleaning steps may be particularly useful when the polymer composition comprises recycled resins. The cleaning may be also used to remove water and/or volatile (lower molecular weight) components, such as residual peroxide and byproducts generated by the chain scission reaction. The cleaning steps may involve one or more of degassing by vacuum.

The process may also further comprise one or more filtering steps. The filtration may remove larger components (e.g., larger than 30 microns) from the molten polymer.

These steps may occur during the heating (e.g., the melt mixing step) or in a subsequent or preliminary step.

Another aspect of the invention relates to a modified olefin polymer composition prepared by a process comprising: melt mixing an olefin polymer composition with a free-radical initiator composition comprising a peroxide-modified inorganic composition prepared from:

i) a liquid or an aqueous hydrogen peroxide, and
ii) one or more inorganic solid particles, wherein the inorganic solid particles have affinity to the hydrogen peroxide through hydrogen bonding, wherein the peroxide-modified inorganic composition initiates a free-radical reaction of the olefin polymer composition to produce a modified olefin polymer composition.

Another aspect of the invention relates to a molded article, fiber, filament, film, melt blown fabric, additive manufacture feedstock, or chemical recycling feedstock formed from the modified olefin polymer composition discussed above.

All above descriptions and all embodiments discussed in the above aspects relating to the free-radical initiator composition and the method for preparing a peroxide-modified inorganic composition, including various aspects of the peroxide-modified inorganic solid particle; the hydrogen peroxide and its concentration; various types of the inorganic solid particles and their sizes and amounts; the association of hydrogen peroxide and the inorganic solid particles to form the peroxide-modified inorganic solid particle; and additional components in the free-radical initiator composition are applicable to this aspect of the invention relating to a process for modifying an olefin polymer composition.

All above descriptions and all embodiments discussed in the above aspect relating to the process for modifying an olefin polymer composition, including various aspects of the olefin polymer compositions; the modification conditions; the various types of reactions and reaction conditions; the melt mixing step and apparatus for conducting the steps; and additional process steps are applicable to these aspects of the invention relating to a modified olefin polymer composition and a molded article, fiber, filament, film, melt blown fabric, additive manufacture feedstock, or chemical recycling feedstock.

The process described above can generate value-added polymer products, such as polyolefins with low viscosity and narrow molecular-weight distribution, suitable for a wide variety of applications, such as in injection molding, compression molding, blow molding, thermoforming, rotomolding, and fiber spinning, nonwoven fabric production; and additive manufacturing processes low-viscosity waxes, including functionalized waxes and semi-crystalline wax feedstocks for chemical recycling processes.

In some embodiments, by using the peroxide-modified inorganic composition to replace the conventional organic peroxide as the free-radical initiator composition, the process can generate a polymer product having a low viscosity, low molecular weight, and high melt flow index, yet retaining the mechanical strength. In particular, using the peroxide-modified inorganic composition as described herein in a process to vis-break the polyolefin polymer can result in a polymer that has a higher melt flow index and a better retained mechanical strength (e.g., a flexural modulus and/or Izod impact strength), as compared to a polymer prepared using a conventional organic peroxide in the same process to vis-break the same polyolefin polymer.

In some embodiments, the modified olefin polymer composition prepared by the process described herein using the peroxide-modified inorganic composition has i) an increased melt flow index and ii) an retained mechanical strength, as compared to the starting, unmodified olefin polymer composition, as well as compared to olefin polymer compositions prepared through conventional techniques involving cracking a polyolefin with an organic peroxide.

In some embodiments, the modified olefin polymer composition prepared by the process described herein using the peroxide-modified inorganic composition has i) an increase in melt flow index of at least 75%, at least 100%, at least 150%, at least 2 fold, at least 2.5 fold, at least 3 fold, at least 3.5 fold, at least 4 fold, at least 4.5 fold, at least 5 fold, at least 5.5 fold, at least 6 fold, at least 7 fold, at least 8 fold, at least 9 fold, or at least 10 fold, as compared to the starting, unmodified olefin polymer composition. The modified olefin polymer composition prepared by the process described herein using the peroxide-modified inorganic composition can also have ii) an increased or retained mechanical strength, characterized by a) either an increase in flexural modulus of at least 1%, at least 2%, at least 3%, at least 4%, at least 5%, at least 6%, at least 7%, at least 8%, at least 9%, at least 10%, at least 15%, or at least 20%, as compared to the starting, unmodified olefin polymer composition; or b) a decrease in flexural modulus of no more than 20%, no more than 15%, no more than 10%, no more than 9%, no more than 8%, no more than 7%, no more than 6%, no more than 5%, no more than 4.5%, no more than 4%, no more than 3.5%, no more than 3%, no more than 2.5%, no more than 2%, no more than 1.5%, or no more than 1%, as compared to the starting, unmodified olefin polymer composition. The melt flow index and flexural modulus measurement methods are illustrated in the Examples.

In one embodiment, the modified olefin polymer composition has an increase in melt flow index of at least 75%, at least 150%, at least 2.5 fold, at least 3 fold, at least 3.5 fold, or at least 5.5 fold; and an increase in flexural modulus of at least 1%, at least 5%, at least 9%, or at least 10%, as compared to the unmodified olefin polymer.

In one embodiment, the modified olefin polymer composition has an increase in melt flow index of at least 75%, at least 150%, at least 2.5 fold, at least 3 fold, at least 3.5 fold, or at least 5.5 fold; and a decrease in flexural modulus of no more than 20%, no more than 15%, no more than 10%, no more than 5%, or no more than 2.5%, as compared to the starting, unmodified olefin polymer composition.

In some embodiments, the modified olefin polymer composition prepared by the process described herein using the peroxide-modified inorganic composition has i) an increase in melt flow index of at least 75%, at least 100%, at least 150%, at least 2 fold, at least 2.5 fold, at least 3 fold, at least 3.5 fold, at least 4 fold, at least 4.5 fold, at least 5 fold, at least 5.5 fold, at least 6 fold, at least 7 fold, at least 8 fold, at least 9 fold, or at least 10 fold, as compared to the starting, unmodified olefin polymer composition. The modified olefin polymer composition prepared by the process described herein using the peroxide-modified inorganic composition can also have ii) an retained mechanical strength, characterized by a same Izod impact strength or a decrease in Izod impact strength of no more than 30%, no more than 25%, no more than 20%, no more than 15%, no more than 10%, no more than 9%, no more than 8%, no more than 7%, no more than 6%, no more than 5%, no more than 4.5%, no more than 4%, no more than 3.5%, no more than 3%, no more than 2.5%, no more than 2%, or no more than 1%, as compared to the starting, unmodified olefin polymer composition. The melt flow index and Izod impact strength measurement methods are illustrated in the Examples.

In one embodiment, the modified olefin polymer composition has an increase in melt flow index of at least 75%, at least 150%, at least 2.5 fold, at least 3 fold, at least 3.5 fold, or at least 5.5 fold; and a decrease in Izod impact strength of no more than 25%, no more than 20%, no more than 15%, no more than 10%, no more than 8%, no more than 3.5%, or no more than 2%, as compared to the starting, unmodified olefin polymer composition.

Conventional free radical reactions of polyolefins with an organic peroxide can generate a significant amount of volatile organic by-products. As a result, polyolefins cracked by an organic peroxide are not suitable for many applications, such as food packaging and medical fabrics and devices. However, by using the peroxide-modified inorganic composition to replace the conventional organic peroxide as the free-radical initiator composition, the process can generate a polymer product with a low VOC content and/or low odor.

In some embodiments, the modified olefin polymer composition prepared by the process described herein using the peroxide-modified inorganic composition has a reduced VOC content or minimally added VOC content, as compared to both the starting, unmodified olefin polymer composition and as compared to olefin polymer compositions prepared through conventional techniques involving cracking a polyolefin with an organic peroxide.

In some embodiments, the modified olefin polymer composition prepared by the process described herein using the peroxide-modified inorganic composition has an reduced VOC content of at least 5%, at least 10%, at least 15%, at least 16%, at least 17%, at least 18%, at least 19%, at least 20%, at least 25%, at least 26%, at least 27%, at least 28%, at least 29%, or at least 30%, as compared to the starting, unmodified olefin polymer composition. In some embodiments, the modified olefin polymer composition prepared by the process described herein using the peroxide-modified inorganic composition has an added VOC content of no more than 10 fold, no more than 9 fold, no more than 8 fold, no more than 7 fold, no more than 6.5 fold, no more than 6 fold, no more than 5.5 fold, no more than 5 fold, no more than 4.5 fold, no more than 4 fold, no more than 3.5 fold, no more than 3 fold, no more than 2.5 fold, no more than 2 fold, no more than 150%, no more than 100%, no more than 90%, no more than 80%, no more than 70%, no more than 60%, no more than 50%, no more than 40%, no more than 30%, no more than 20%, no more than 15%, no more than 10%, or no more than 5%, as compared to the starting, unmodified olefin polymer composition. The VOC measurement methods are illustrated in the Examples.

In one embodiment, the modified olefin polymer composition prepared by the process described herein using the peroxide-modified inorganic composition has an reduced VOC content of at least 5%, at least 15%, at least 17%, at least 20%, at least 25%, or at least 27%, as compared to the starting, unmodified olefin polymer composition.

In one embodiment, the modified olefin polymer composition prepared by the process described herein using the peroxide-modified inorganic composition has an added VOC content of no more than 9 fold, no more than 6 fold, no more than 2 fold, no more than 150%, no more than 100%, no more than 80%, no more than 70%, no more than 50%, no more than 20%, or no more than 5%, as compared to the starting, unmodified olefin polymer composition.

In some embodiments, the olefin polymers being modified are PCR or PIR plastic wastes. The modified polyolefins have a lower viscosity than the unmodified PCR or PIR plastic wastes and contain residual inorganic solid particle (e.g., metal oxides) that can catalyze the downstream chemical recycling processes, including oxy-cracking, thermal liquefaction, and pyrolysis.

The modified olefin polymer composition can be in a form of solid, wax, liquid, volatile, or a combination thereof.

In some embodiments, a chemical recycling feedstock is formed from the modified olefin polymer composition discussed above, and the chemical recycling feedstock is employed in a chemical recycling process selected from the group consisting of pyrolysis, thermal or catalytic depolymerization, hydrogenation, hydrocraking, oxycracking, gasification, and hydrothermal liquefaction.

EXAMPLES

The following examples are for illustrative purposes only and are not intended to limit, in any way, the scope of the present invention.

Example A—Preparation and Characterization of an Exemplary Peroxide-Modified Inorganic Solid Particle Composition Various peroxide-modified metal oxides were prepared by adding 0.1 gram of a metal oxide powder to a 10-mL glass vial along with 1 mL of 30 wt/wt HOOH (aqueous) liquid and 1 mL de-ionized water. After swirling the vial to mix the metal oxide powder with the HOOH solution, the liquid was decanted from the vial, and the modified metal oxide powder was dried under vacuum for a few minutes at ambient temperature.

Exemplary metal oxides used include cerium dioxide ($CeO_2$) nanoparticle powder (Fisher Scientific, CAS #1306-3), fine particle size zinc oxide (ZnO) powder (Zochem, ZOCO 102 USP), and titanium dioxide ($TiO_2$) anatase nanopowder/nanoparticle.

Figure 1B:
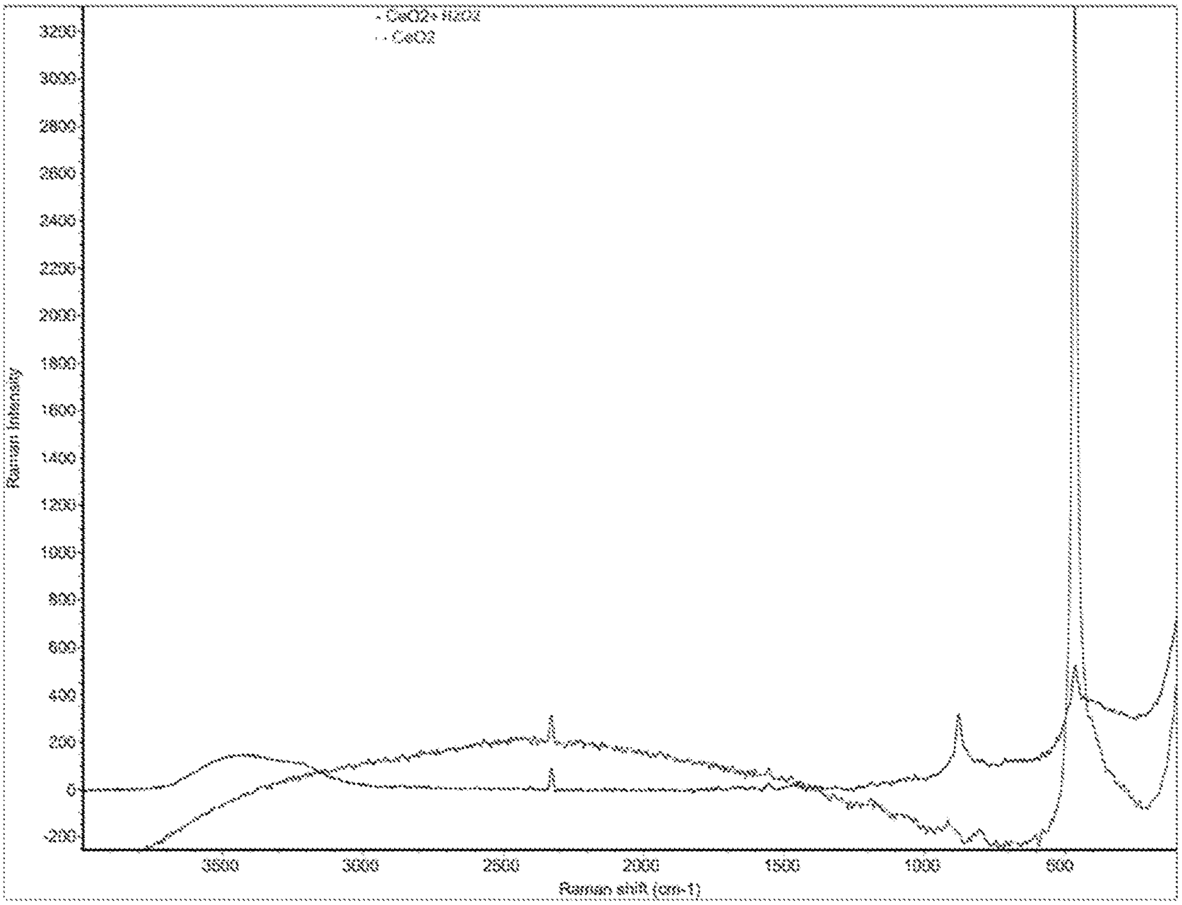
FIG. 1B shows the Raman spectra of and HOOH-modified $CeO_2$ as compared to the $CeO_2$ control.

Raman spectroscopy was used to analyze the resulting peroxide-modified metal oxides. The results for HOOH-modified ZnO and HOOH-modified $CeO_2$ are shown in FIG. 1A and FIG. 1B, respectively. The sharp peak appearing at 800 $cm^{-1}$ in the HOOH-modified metal oxides is associated with an OO stretch, which confirms that a peroxide moiety was present in the HOOH-modified metal oxides. The broad peak at 3400 $cm^{-1}$ is associated with an —OH stretch, which can be attributed to the HOOH and $H_2O$ that were added to the metal oxides.

Example B—Modifying Olefin Polymer Compositions by Peroxide-Modified Inorganic Solid Particles (a Batch Process)

In this example, a series of experiments were conducted in a batch process, in which polypropylene (PP), post-industrial recycled (PIR) polypropylene, or polyethylene (PE, e.g., LLDPE) polymers were heated with various exemplary peroxide-modified metal oxide compositions, to illustrate the effectiveness of the inventive peroxide-modified metal oxides as free-radical generators for polyolefin reactions.

The peroxide-modified metal oxide compositions were prepared according to Example A. In a first set of examples, the metal oxide was cerium dioxide ($CeO_2$) nanoparticle powder (Fisher Scientific, CAS #1306-3). In a second set of examples, the metal oxide was fine particle size zinc oxide (ZnO) powder (Zochem, ZOCO 102 USP). In a third set of examples, the metal oxide was titanium dioxide ($TiO_2$) anatase nanopowder/nanoparticle.

The PP composition used was a commercially available polypropylene homopolymer (Braskem H521), having a melt flow rate of 4 g/10 min measured according to ASTM D 1238 (230° C./2.16 kg). The PIR polypropylene used was a commercially available recycled, biaxially oriented PP homopolymer film, which was re-pelletized and sold by SSD Designs LLC (ResAlt H-721044). The PE composition was a commercially available linear low density polyethylene (LLDPE) (Braskem Flexus 9200). Prior to the vial test experiments, the PP, PIR, and PE pellets were ground to a coarse flake using a Wiley mill at ambient temperature.

To demonstrate the effect of modifying the olefin polymers with the peroxide-modified metal oxides, 0.25 grams of the olefin polymer (PP, PIR, or PE) was added to a 10-mL glass vial. Then, 0.0125 grams of HOOH-modified metal oxide (HOOH-modified ZnO, $CeO_2$, or $TiO_2$) was added to the vial, and the powders were mixed. The vials were placed in a glove box antechamber. Air and water were removed using vacuum, and then the vials were blanketed with $N_2$ gas and closed with an aluminum cap. The formulations and reaction temperatures are summarized in Table I. In addition to the inventive examples that included the peroxide-modified metal oxides in the reactions, a series of comparative examples were provided, which were prepared and heated under the same conditions, but without including the peroxide-modified metal oxides. The comparative examples are labeled as "C1-C6" in Table I. The control samples were unheated polymers without adding the PMMO.

TABLE I

Test conditions for modifying polyolefin with peroxide-modified metal oxides (PMMO)

| Example | Polymer | PMMO | PMMO (wt %) | T (° C.) |
|---|---|---|---|---|
| Example 1.1 | LLDPE | $CeO_2$—HOOH | 5 | 350 |
| Example 1.2 | PP | $CeO_2$—HOOH | 5 | 350 |
| Example 1.3 | PIR | $CeO_2$—HOOH | 5 | 350 |
| Example 2.1 | LLDPE | ZnO—HOOH | 5 | 400 |
| Example 2.2 | PP | ZnO—HOOH | 5 | 400 |
| Example 2.3 | PIR | ZnO—HOOH | 5 | 400 |
| Example 3.1 | LLDPE | $TiO_2$—HOOH | 5 | 350 |
| Example 3.2 | PIR | $TiO_2$—HOOH | 5 | 350 |
| Example 3.3 | PP | $TiO_2$—HOOH | 5 | 350 |
| Example 3.4 | LLDPE | $TiO_2$—HOOH | 5 | 400 |
| Example 3.5 | PP | $TiO_2$—HOOH | 5 | 400 |
| Example 3.6 | PIR | $TiO_2$—HOOH | 5 | 400 |
| C1 | LLDPE | | | 350 |
| C2 | PP | | | 350 |
| C3 | PIR | | | 350 |
| C4 | LLDPE | | | 400 |
| C5 | PP | | | 400 |
| C6 | PIR | | | 400 |
| Control | LLDPE | | | |
| Control | PP | | | |

The glass vials were heated to the temperature (shown in Table I) using an aluminum block on a heating plate. They were then removed from heat, and the contents were analyzed by GPC-IR to measure the polymer molecular weight distributions after reaction with the peroxide-modified metal oxides. The results are shown in Table II.

Compared to the unheated PP and PE control samples, each of the samples that was heated to 350° C. or 400° C. had significantly lower molecular weight, indicating that thermolysis de-polymerization occurred at these temperatures.

At 350° C., the PP and PIR samples heated with HOOH-modified $TiO_2$ ($TiO_2$—HOOH) exhibited lower molecular weights than the samples that were heated but without a PMMO. At 400° C., the PP and PIR that were heated with $TiO_2$—HOOH or ZnO—HOOH exhibited significantly lower molecular weights than the samples that were heated without a PMMO.

These observations demonstrate that the peroxide-modified metal oxides initiated the free-radical scission reaction for the polyolefins in a greater degree than that caused by the thermolysis alone.

TABLE II

Molecular weight distributions for polyolefin modified with peroxide-modified metal oxides (PMMO)

| Example | Polymer | PMMO | Mn (g/mol) | Mw (g/mol) | Mw/Mn | Mz (g/mol) | Mz1 (g/mol) |
|---|---|---|---|---|---|---|---|
| Example 1.1 | LLDPE | $CeO_2$—HOOH | 14900 | 52900 | 3.5 | 99500 | 162100 |
| Example 1.2 | PP | $CeO_2$—HOOH | 16800 | 57100 | 3.4 | 101700 | 155400 |
| Example 1.3 | PIR | $CeO_2$—HOOH | 19000 | 81600 | 4.3 | 165200 | 277400 |
| Example 2.1 | LLDPE | ZnO—HOOH | 3000 | 9100 | 3.1 | 18800 | 31200 |
| Example 2.2 | PP | ZnO—HOOH | 1600 | 4300 | 2.8 | 7400 | 10500 |
| Example 2.3 | PIR | ZnO—HOOH | 2000 | 5900 | 3.0 | 10600 | 16400 |
| Example 3.1 | LLDPE | $TiO_2$—HOOH | 10300 | 45900 | 4.4 | 99300 | 195900 |
| Example 3.2 | PIR | $TiO_2$—HOOH | 8600 | 33800 | 3.9 | 65500 | 105700 |
| Example 3.3 | PP | $TiO_2$—HOOH | 7600 | 29600 | 3.9 | 65100 | 157300 |
| Example 3.4 | LLDPE | $TiO_2$—HOOH | 3100 | 9500 | 3.0 | 25000 | 80700 |
| Example 3.5 | PP | $TiO_2$—HOOH | 1300 | 3400 | 2.7 | 5600 | 7600 |
| Example 3.6 | PIR | $TiO_2$—HOOH | 1500 | 4100 | 2.8 | 6800 | 9300 |
| C1 | LLDPE | | 12000 | 45900 | 3.8 | 89600 | 142900 |
| C2 | PP | | 14000 | 53300 | 3.8 | 112800 | 190500 |
| C3 | PIR | | 15100 | 54700 | 3.6 | 104800 | 167700 |
| C4 | LLDPE | | | | | | |
| C5 | PP | | 1900 | 5100 | 2.7 | 8600 | 12100 |
| C6 | PIR | | 2400 | 6600 | 2.8 | 11100 | 16100 |
| Control | LLDPE | | 20150 | 95250 | 4.7 | 171550 | 28800 |
| Control | PP | | 30800 | 337300 | 11.0 | 1082350 | 2636000 |

Example C—Modifying Olefin Polymer Compositions by Peroxide-Modified Inorganic Solid Particles (a Semi-Continuous, Extrusion Process)

In this example, a series of experiments were conducted in a micro-compounder, in which polypropylene (PP) or polyethylene (PE, e.g., LLDPE) polymers were heated with various exemplary peroxide-modified metal oxide compositions, to demonstrate the effective of the inventive peroxide-modified metal oxides as a free-radical generator for reaction with polypropylene or polyethylene in an extrusion process.

The peroxide-modified metal oxide compositions used were HOOH-modified metal oxide (HOOH-modified ZnO or $CeO_2$), prepared according to Example A.

Modification of Polypropylene

The PP composition used was a commercially available polypropylene homopolymer (Braskem H521), having a melt flow rate of 4 g/10 min measured according to ASTM D 1238 (230° C./2.16 kg).

The reactive extrusion was conducted in a commercial twin-screw micro-compounder instrument (Xplore, Xplore MC 15 HT), in a semi-continuous process. All six heating zones were set to the target temperature (see Table III below). Nitrogen gas was fed continuously to the top of the extrusion chamber to minimize atmospheric oxygen in the process. The screw speed was set to 150 rpm, and then with the screws rotating, 4 grams of PP pellets were added to the extruder using the pneumatic feeder. After one minute of melting and mixing, 5% of the peroxide-modified metal oxide powder (HOOH-modified ZnO) was added to the hopper through the pneumatic mixer. After melting/mixing for an additional minute, the valve was opened, and the extrudate was collected in a water bath situated under the die. Comparative examples were also provided, which were prepared and heated under the same conditions, but without including the peroxide-modified metal oxides. The formulations and reaction temperatures are summarized in Table III. The comparative examples are labeled as "C7-C8" in Table III. The control samples were unheated polymers without adding the PMMO.

The molecular weights of the extrudate were measured using GPC. The results are shown in Table III. The Mw results in Table III demonstrate that modification of the polypropylene by the PMMO led to a very significant reduction in PP molecular weight at a given temperature, compared to the polypropylenes that were heated but without a PMMO. At 250° C., extrusion with ZnO—HOOH decreased Mw to less than 30% of its initial value (97,000 vs 337,000 g/mol). In comparison, at 250° C., extrusion with heating but without a PMMO did not lead to a significant Mw decrease relative to the control sample.

TABLE III

| PP extruded with peroxide-modified metal oxides (PMMO) | | | | | | | |
|---|---|---|---|---|---|---|---|
| Example | T (° C.) | PMMO | Mn (g/mol) | Mw (g/mol) | Mw/Mn | Mz (g/mol) | Mz1 (g/mol) |
| C7 | 250 | | 29000 | 322400 | 11.1 | 980200 | 2246800 |
| Example 4 | 250 | ZnO—HOOH | 14700 | 96700 | 6.6 | 217000 | 357300 |
| C8 | 350 | | 13200 | 74200 | 5.6 | 159400 | 257600 |
| Example 5 | 350 | ZnO—HOOH | 9400 | 59900 | 6.4 | 134300 | 204500 |
| Control | | | 30800 | 337,300 | 11.0 | 1,082,350 | 2,636,000 |

Figure 2:
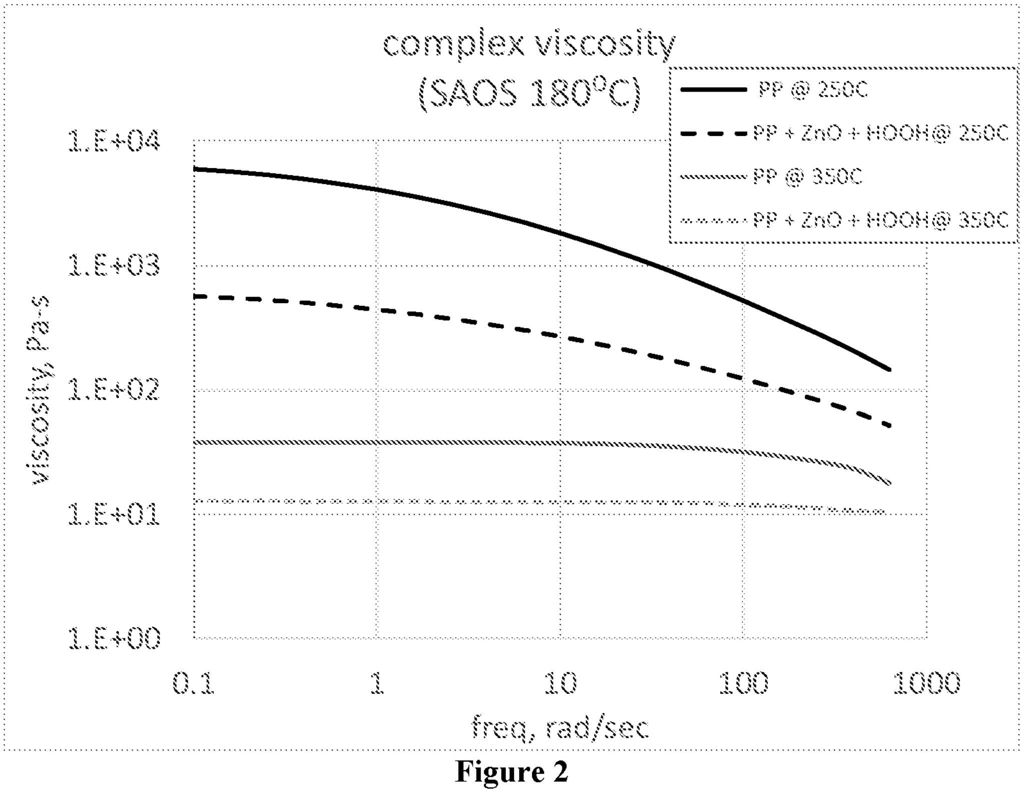
FIG. 2 shows the complex viscosity of polypropylene extruded with the peroxide-modified metal oxide in a micro-compounder.

The shear rheology of the extrudate was measured using small-angle oscillatory shear rheology (SAOS). The results are shown in FIG. 2. FIG. 2 demonstrates that the PP composition extruded with ZnO—HOOH exhibited significantly lower viscosity than the PP samples that were heated to the same temperature but without the addition of a PMMO. This result indicates that the PMMO compositions (e.g., ZnO—HOOH) can be used in reactive extrusion processes to produce low-viscosity waxes, which can be used advantageously as feedstock for various processes such as pyrolysis, chemical recycling, injection molding, or fiber processing.

Modification of Polyethylene

The PE composition used was a commercially available linear low-density polyethylene (LLDPE) (Braskem, Flexus 9200).

The reactive extrusion was conducted in a commercial twin-screw micro-compounder instrument (Xplore, Xplore MC 15 HT). All six heating zones were set to the target temperature (see Table IV below). After cleaning the instrument in 4 separate purge steps, 4 grams of LLDPE were added to the extruder and were melted/mixed for one minute using a screw speed of 150 rpm. Then, 1 gram of LLDPE powder blended with 0.35 grams of the peroxide-modified metal oxide powder (HOOH-modified ZnO) were added using the pneumatic feeding hopper. Because at least 2 grams of polymer remains in the recycle loop after each extrusion, the total weight of the PE polymer in the extruder was 7 grams, and the amount of the PMMO was 5 wt %. After melting/mixing for an additional minute, the valve was opened, and the extrudate was collected in a water bath situated under the die. Comparative examples were also provided, which were prepared and heated under the same conditions, but without including the peroxide-modified metal oxides. The formulations and reaction temperatures are summarized in Table IV. The comparative examples are labeled as “C10-C11” in Table IV. The control sample was unheated polymer without adding the PMMO.

Figure 3:
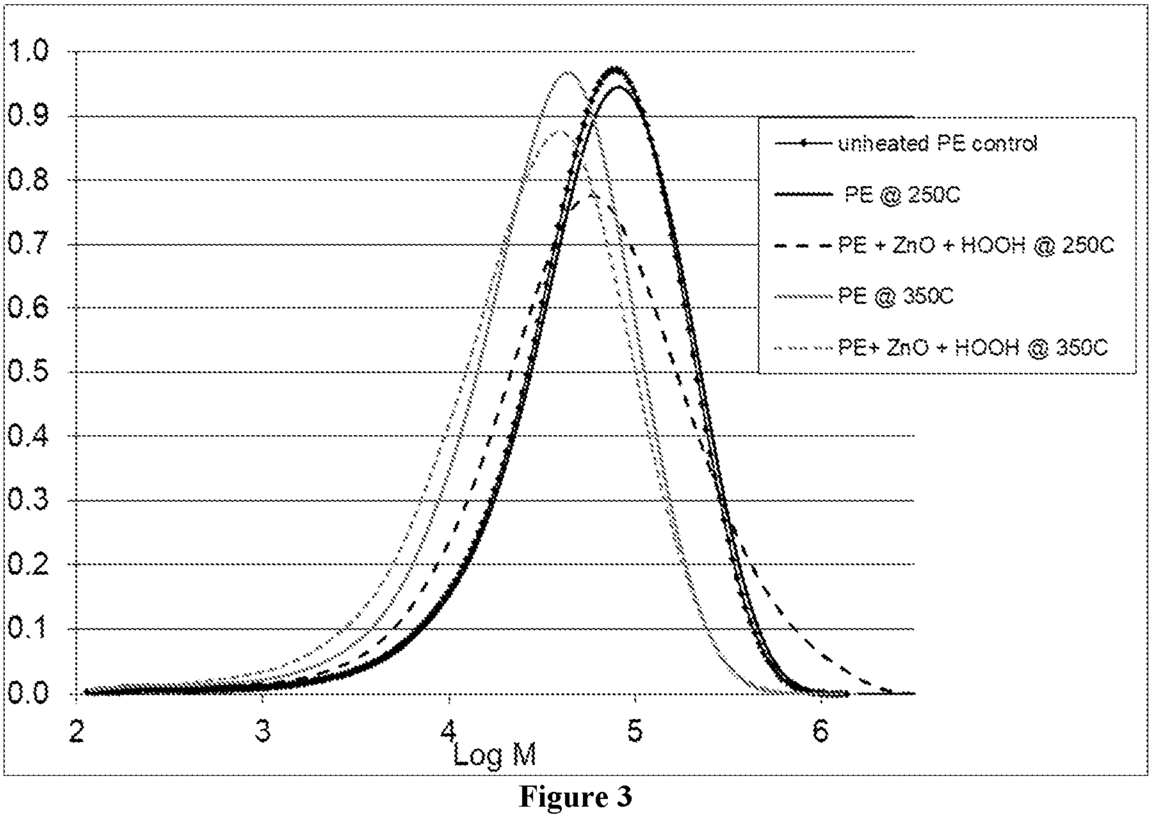
FIG. 3 shows the molecular weight distributions of polyethylene extruded with the peroxide-modified metal oxide in a micro-compounder.

The molecular weights of the extrudate were measured using GPC. The results are shown in Table IV and FIG. 3. The results demonstrate that modification of the polyethylene by the PMMO (e.g., ZnO—HOOH) increased the degree of PE crosslinking at 250° C., leading to a higher molecular weight values and a significantly broader molecular weight distribution than the polyethylenes that were heated but without a PMMO. At the higher temperatures (e.g., 350° C.), the PE polymer chains underwent scission, leading to a molecular weight values lower than the control sample. At the higher temperatures, modification of the polyethylene by the PMMO (e.g., ZnO—HOOH) increased the degree of scission than the polyethylenes that were heated but without a PMMO, evidenced by the appearance of a low molecular weight tail on the left side of the molecular weight distribution plot (FIG. 3).

TABLE IV

| LLDPE extruded with peroxide-modified metal oxides (PMMO) | | | | | | | |
|---|---|---|---|---|---|---|---|
| Example | T (° C.) | PMMO | Mn (g/mol) | Mw (g/mol) | Mw/Mn | Mz (g/mol) | Mz1 (g/mol) |
| C10 | 250 | | 14600 | 100400 | 6.9 | 196800 | 308700 |
| Example 6 | 250 | ZnO—HOOH | 12400 | 121400 | 9.8 | 433500 | 850200 |
| C11 | 350 | | 10600 | 52100 | 4.9 | 104600 | 167800 |
| Example 7 | 350 | ZnO—HOOH | 8900 | 48600 | 5.4 | 110000 | 189700 |
| Control | | | 20150 | 95250 | 4.7 | 171550 | 28800 |

Figure 4:
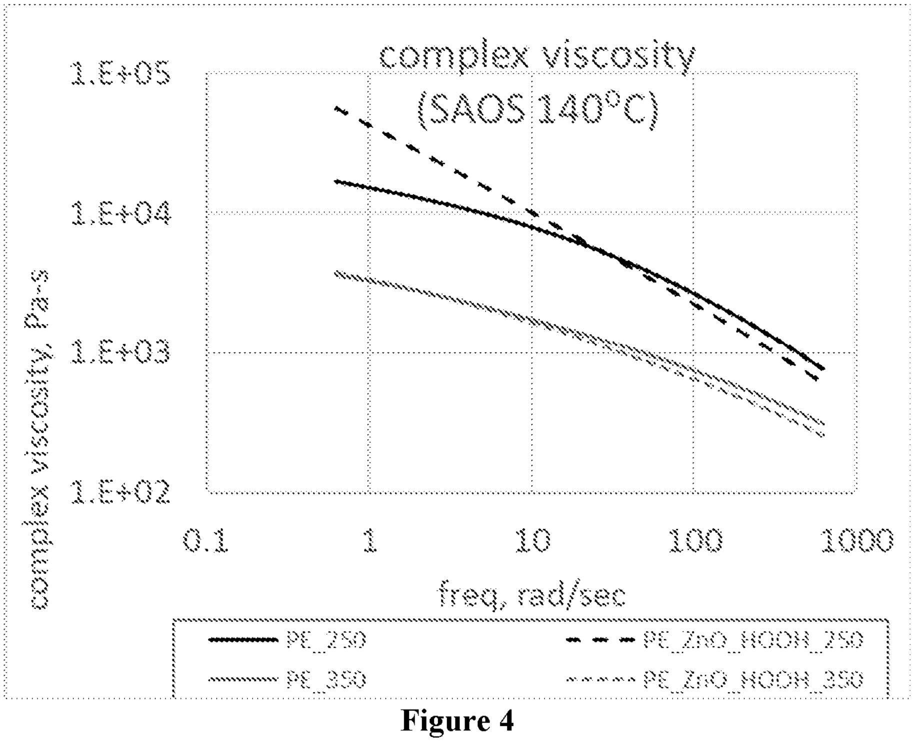
FIG. 4 shows the complex viscosity of polyethylene (LLDPE) extruded with the peroxide-modified metal oxide in a micro-compounder.
Figure 5:
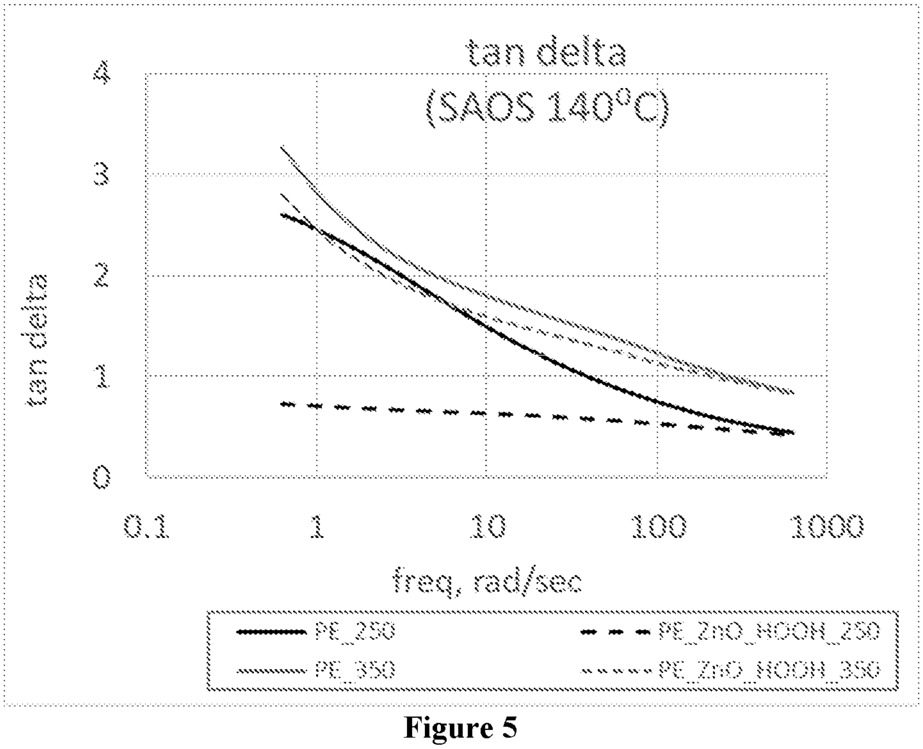
FIG. 5 shows the tan delta of polyethylene (LLDPE) extruded with the peroxide-modified metal oxide in a micro-compounder.

The shear rheology of the extrudate was measured using small-angle oscillatory shear rheology (SAOS). The results are shown in FIGS. 4 and 5. As shown in FIG. 4, at 250° C., the modification of the polyethylene by the PMMO (e.g., ZnO—HOOH) increased the low-frequency complex viscosity, compared to the polyethylenes that were heated but without a PMMO. FIG. 5 shows that, at 250° C., the modification of the polyethylene by the PMMO (e.g., ZnO—HOOH) resulted in a very low tan delta suggesting a high degree of melt elasticity, compared to the polyethylenes that were heated but without a PMMO. These results confirmed that HOOH-modified ZnO promoted the crosslinking of LLDPE at a lower temperature (e.g., at 250° C.).

Additionally, as shown in FIG. 4, at 350° C., the modification of the polyethylene by the PMMO (e.g., ZnO—HOOH) decreased the high-frequency complex viscosity indicating a shear thinning, compared to the polyethylenes that were heated but without a PMMO. These results confirmed that HOOH-modified ZnO promoted the chain scissioning of LLDPE at a higher temperature (e.g., at 350° C.).

Example D—Modifying Olefin Polymer Compositions by Peroxide-Modified Inorganic Solid Particles (a Continuous, Extrusion Process)

In this example, a series of experiments was conducted in a twin screw extruder in which polypropylene (PP) polymers were heated with various exemplary peroxide-modified metal oxide compositions, to demonstrate that the effective of the inventive peroxide-modified metal oxides as a free-radical generator to initiate chain scission reaction for polypropylene in an extrusion process to provide viscosity reduction.

The peroxide-modified metal oxide composition used was HOOH-modified ZnO, prepared according to Example A. The PP composition used was a commercially available polypropylene homopolymer (Braskem H521), having a melt flow rate of 4 g/10 min measured according to ASTM D 1238 (230° C./2.16 kg).

The reactive extrusion was conducted in a commercial 11 mm twin-screw extruder (Thermo), in a semi-continuous process. The screw was a basic mixing screw with L/D=40. The PP pellets were fed to the hopper of the twin-screw extruder. Nitrogen gas was fed to the feed throat throughout the extrusion to minimize oxygen fed to the process. The screw speed was set to 250 rpm. The barrel temperatures were set to a flat profile, with the die temperature 15° C. lower. After the PP extrusion reached a steady state, the peroxide-modified metal oxide powder (HOOH-modified ZnO, at 1 wt % or 2.5 wt %) was fed directly into the barrel through an open port near the feed throat. The extrudate was cooled in a water bath, dried by an air knife, and pelletized. Comparative examples were also provided, which were prepared and heated under the same conditions, but without including the peroxide-modified metal oxides (C13, C15, and C17). There were also comparative examples, which were prepared and heated under the same conditions, with including metal oxides, but the metal oxide was not modified by HOOH (ZnO) (C14, C16, and C18). The formulations and reaction temperatures are summarized in Table V. The control sample was unheated polymer without adding the PMMO.

Figure 6:
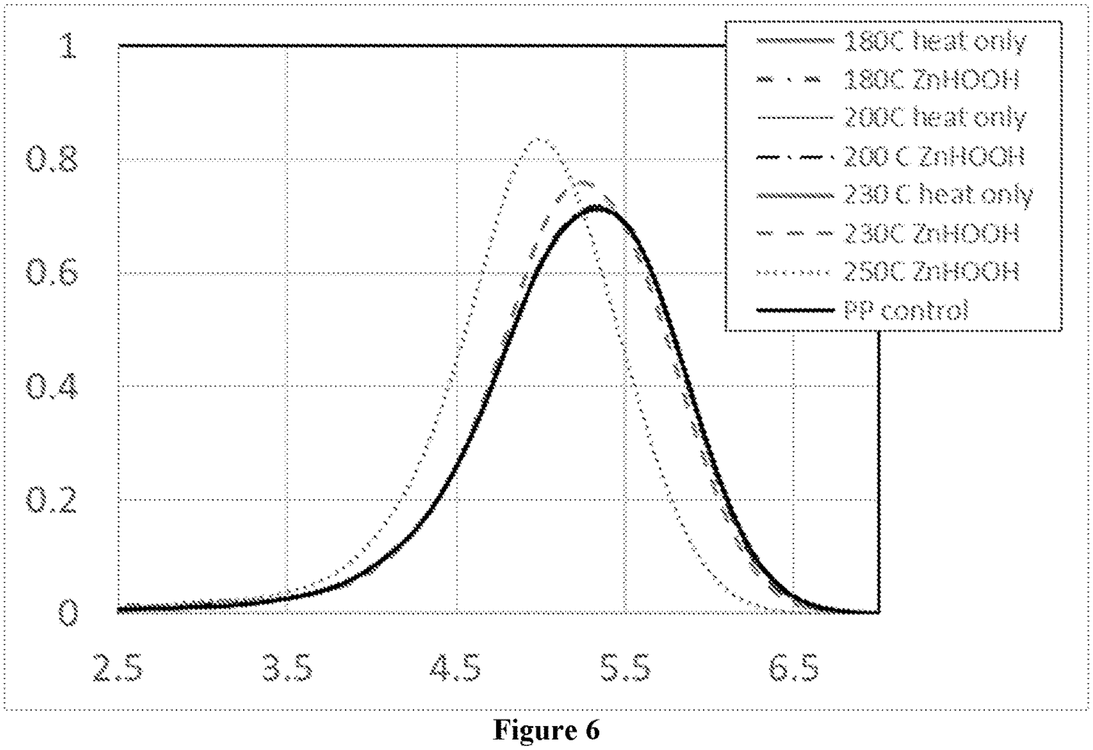
FIG. 6 shows the molecular weight distributions of polyethylene extruded with the peroxide-modified metal oxide in an 11 mm twin-screw extruder, at various temperatures.
Figure 7:
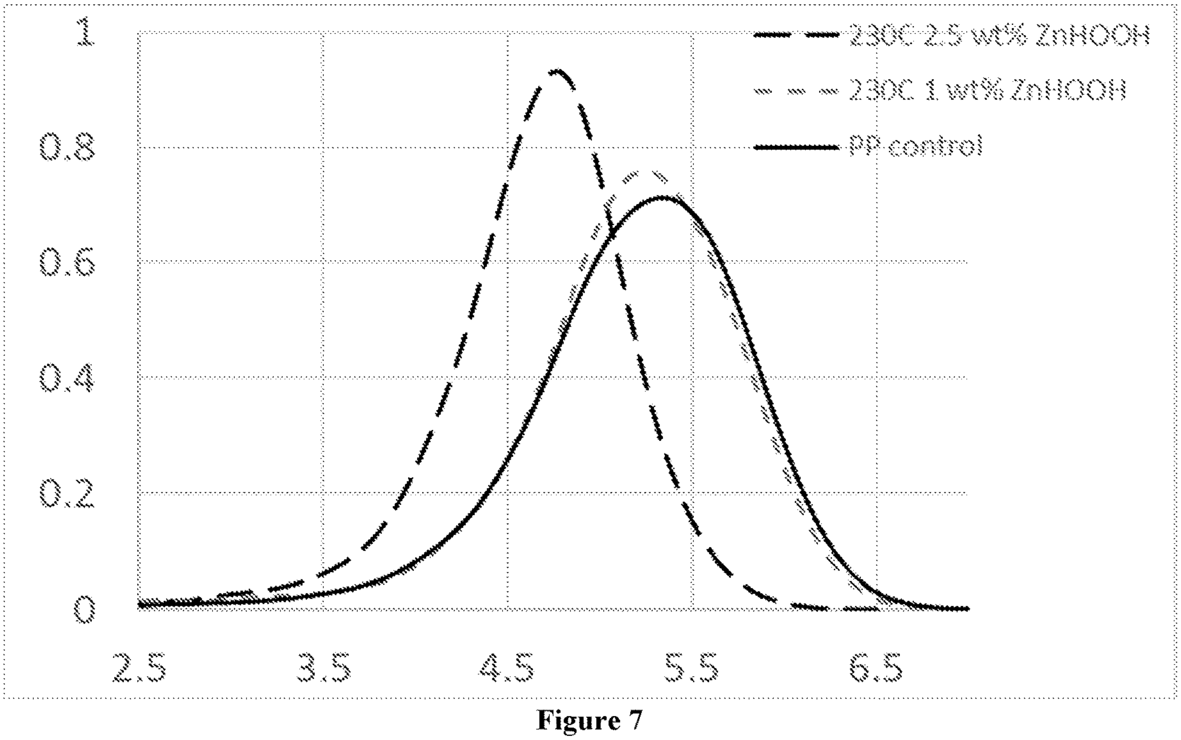
FIG. 7 shows the molecular weight distributions of polyethylene extruded with the peroxide-modified metal oxide in an 11 mm twin-screw extruder, at various concentrations of the peroxide-modified metal oxide.

The molecular weights of the extrudate were measured using GPC. The results are shown in Table V and FIGS. 6-7. These results show that the viscosity of PP polymer can be reduced by modification using PMMO in an extruder operating at the temperatures and residence times that are typical of a melt extrusion process.

Gel permeation chromatography (GPC)/IR measurements: GPC measurements were carried out on a GPC-IR® (Polymer Char, Valencia, Spain), which is a high-temperature GPC instrument with IR detection. Various molecular weights (number average molecular weight $M_n$, weight average molecular weight $M_w$, z-average molecular weight $M_z$, and z+1 average molecular weight $M_{z1}$), and $M_w/M_n$ of the polymer samples were determined by GPC-IR measurements. GPC-IR experiments performed included the use of GPC-IR5 detector, a 1 mL/min flow rate, a dissolution temperature of 150° C. for 90 minutes, a unit temperature of 150° C., and a viscometer temperature set at 65° C. A precolumn used during the experiments was the Agilent PLgel Olexis Guard 50×7.5 mm, and other columns used during the experiments were the Agilent PLgel Olexis Guard 300×7.5 mm having theoretical plate counts over 15,000. All GPC-IR experiments were performed according to standards ASTM D6474 and ISO 16014-4.

Small-angle oscillatory shear rheology (SAOS) measurements: The complex viscosity was measured using an ARES-G2 rheometer (TA Instruments). The Small-angle Oscillatory Shear (SAOS) rheology test was conducted using parallel plates with 25 mm. The gap was set to 1 mm. Frequency sweeps were conducted at a test temperature of 180° C.

Example E—Modifying Olefin Polymer Compositions by Peroxide-Modified Inorganic Solid Particles (a Continuous, Extrusion Process)

In this example, a series of experiments was conducted in a twin screw extruder in which polypropylene (PP) polymers were heated with various exemplary peroxide modified metal oxide (PMMO) compositions, to demonstrate the effectiveness of the PMMO as a free-radical generator to initiate chain scission reaction for polypropylene in an extrusion process to provide viscosity reduction.

The peroxide-modified metal oxide composition used was HOOH-modified ZnO, prepared according to Example A. The PP compositions used were two commercially-available

TABLE V

PP extruded with peroxide-modified metal oxides (PMMO)

| Example | T (° C.) | PMMO | Mn (g/mol) | Mw (g/mol) | Mw/Mn | Mz (g/mol) | Mz1 (g/mol) |
|---|---|---|---|---|---|---|---|
| C13 | 180 | | 32700 | 336100 | 10.3 | 1072400 | 2562600 |
| C14 | 180 | ZnO (no HOOH) | 24400 | 317900 | 13.1 | 942400 | 1981200 |
| Example 8 | 180 | 1 wt % ZnO—HOOH | 28400 | 326100 | 11.5 | 973700 | 2100700 |
| C15 | 200 | | 33500 | 338000 | 10.1 | 1087100 | 2669500 |
| C16 | 200 | ZnO (no HOOH) | 26700 | 324700 | 12.2 | 959500 | 2038600 |
| Example 9 | 200 | 1 wt % ZnO—HOOH | 26000 | 322100 | 12.4 | 953500 | 2028200 |
| C17 | 230 | | 31600 | 336600 | 10.6 | 1084300 | 2663400 |
| C18 | 230 | ZnO (no HOOH) | 27000 | 324600 | 12.0 | 949500 | 1995200 |
| Example 10 | 230 | 1 wt % ZnO—HOOH | 26300 | 296200 | 11.3 | 852900 | 1773000 |
| Example 11 | 250 | 1 wt % ZnO—HOOH | 15100 | 80200 | 5.3 | 217600 | 508400 |
| Example 12 | 230 | 2.5 wt % ZnO—HOOH | 20400 | 160700 | 7.9 | 429900 | 597600 |

Measuring Methods for Structural Properties of the Polymer Samples

Melt flow rate (MFR) measurements. The melt flow rates of the polymer samples were measured at 230° C. with a 2.16 kg melt indexer weight in accordance with the ASTM D 1238 standard.

Raman measurements: Raman spectra of the polymer samples were recorded on a Thermo Scientific DXR3 SmartRaman spectrometer from 4000 to 100 $cm^{-1}$.

polypropylene homopolymers, having melt flow rates of 3.6 g/10 min and 38.8 g/10 min, respectively, measured according to ASTM D 1238 (230° C./2.16 kg).

The reactive extrusion was conducted in a commercial 18 mm twin-screw extruder (Coperion ZSK), in a continuous process. The screw was a basic mixing screw with L/D=40. A mixture of the PP powder and PMMO mixture (HOOH-modified ZnO, at 1 wt % or 2 wt %) were fed to the hopper of the twin-screw extruder. Nitrogen gas was fed to the feed throat throughout the extrusion to minimize oxygen fed to the process. The screw speed was set to 300 rpm. The barrel temperatures were set to the profile in Table VI. The extrudate was cooled in a water bath, dried by an air knife, and pelletized.

TABLE VI

| Extruder temperature profile | | | | | | | |
|---|---|---|---|---|---|---|---|
| Heating Zone | 1 | 2 | 3 | 4 | 5 | 6 | 7 |
| Temperature | 140° C. | 160° C. | 190° C. | 200° C. | 200° C. | 210° C. | 210° C. |

The tested examples are labeled as Examples 13-14 (for PP compositions having a MFR of 3.6 g/10 min) and Examples 15-16 (for PP compositions having a MFR of 38.8 g/10 min), and the formulations of these tested examples are summarized in Table VII.

For Examples 13-14 (for PP compositions having a MFR of 3.6 g/10 min), comparative examples were prepared and heated under the same conditions, but without the PMMO (C19); and comparative examples C20-21 were prepared and heated under the same conditions, but with an organic peroxide instead of PMMO. For Examples 15-16 (for PP compositions having a MFR of 38.8 g/10 min), comparative examples were prepared and heated under the same conditions, but without the PMMO (C22); and comparative examples C23-24 were prepared and heated under the same conditions, but with an organic peroxide instead of PMMO. The formulations are summarized in Table VII.

The pellets collected from the above extrusion were molded into tensile bars. The flexural modulus and izod impact strength properties for each of comparative Examples C19-C24 and tested Examples 13-16 were measured. The results are shown below in Table VII. The results show that polypropylene was cracked to a polymer with a high melt flow with by modification using PMMO in an extruder operating at the temperatures and residence times that are typical of a melt extrusion process. Also, compared to a polypropylene cracked using a conventional organic peroxide, the polypropylene cracked using PMMO performed better in retaining the mechanical properties.

TABLE VII

Flex modulus and izod impact strength properties of PP extruded with PMMO* (as compared to PP extruded with an organic peroxide)

| Example | Free-radical initiator | MFI (g/10 min) | Flex Modulus (kpsi) | Izod Impact Strength (ft-lb/in) |
|---|---|---|---|---|
| C19 | None | 38.8 | 266.8 | 0.434 |
| C20 | 0.05 wt % Trigonox 101 | 151.2 | 242.7 | 0.344 |
| C21 | 0.10 wt % Trigonox 101 | 271.2 | 239.1 | 0.319 |
| Example 13 | 1 wt % ZnO—HOOH | 147.3 | 290.7 | 0.420 |
| Example 14 | 2 wt % ZnO—HOOH | 263.2 | 281.7 | 0.354 |
| C22 | None | 3.6 | 270.5 | 0.902 |
| C23 | 0.013 wt % Trigonox 101 | 7.6 | 225.6 | 0.739 |
| C24 | 0.04 wt % Trigonox 101 | 15.4 | 216.6 | 0.651 |
| Example 15 | 1 wt % ZnO—HOOH | 6.3 | 243.4 | 0.832 |
| Example 16 | 2 wt % ZnO—HOOH | 16.1 | 264.3 | 0.885 |

*The XRD data characterization on the PMMO (HOOH-modified ZnO) suggest that using HOOH to modify ZnO produced $ZnO_2$.

The pellets were also collected into sealed vials directly after the pelletizer. These samples were tested for volatile organic compounds (VOC) content using GC/MS. The results are shown below in Table VIII. The results show that the PMMO can crack polypropylene to a polymer having similar melt flow rate as the polymer cracked by a conventional peroxide, but with little to no added VOCs.

TABLE VIII

Volatile organic compounds content of PP extruded with PMMO* (as compared to PP extruded with an organic peroxide)

| Example | Free-radical initiator | MFI (g/10 min) | VOC content (ppm) |
|---|---|---|---|
| C19 | None | 38.8 | 293 |
| C20 | 0.05 wt % Trigonox 101 | 151.2 | 755 |
| C21 | 0.10 wt % Trigonox 101 | 271.2 | 1,014 |
| Example 13 | 1 wt % ZnO—HOOH | 147.3 | 242 |
| Example 14 | 2 wt % ZnO—HOOH | 263.2 | 213 |
| C22 | None | 3.6 | 38 |
| C23 | 0.013 wt % Trigonox 101 | 7.6 | 272 |
| C24 | 0.04 wt % Trigonox 101 | 15.4 | 397 |
| Example 15 | 1 wt % ZnO—HOOH | 6.3 | 45 |
| Example 16 | 2 wt % ZnO—HOOH | 16.1 | 65 |

*The XRD data characterization on the PMMO (HOOH-modified ZnO) suggest that using HOOH to modify ZnO produced $ZnO_2$.

Measuring Methods for Structural Properties of the Polymer Samples

Melt flow rate (MFR) measurements. The melt flow rates of the polymer samples were measured at 230° C. with a 2.16 kg melt indexer weight in accordance with the ASTM D 1238 standard.

Gel permeation chromatography (GPC)/IR measurements: GPC measurements were carried out on a GPC-IR® (Polymer Char, Valencia, Spain), which is a high-temperature GPC instrument with IR detection. Various molecular weights (number average molecular weight $M_n$, weight average molecular weight $M_w$, z-average molecular weight $M_z$, and z+1 average molecular weight $M_{z1}$), and $M_w/M_n$ of the polymer samples were determined by GPC-IR measurements. GPC-IR experiments performed included the use of GPC-IR5 detector, a 1 mL/min flow rate, a dissolution temperature of 150° C. for 90 minutes, a unit temperature of 150° C., and a viscometer temperature set at 65° C. A precolumn used during the experiments was the Tosoh GMHHR-H(S) HT2 Guard Column 50×7.5 mm, and other columns used during the experiments were the Tosoh GMHHR-H(S) HT2 Column 300×7.5 mm having theoretical plate counts over 28,000. All GPC-IR experiments were performed according to standards ASTM D6474 and ISO 16014-4.

Gas chromatography/Mass Spectrometry measurements: GC/MS measurements were carried out in accordance with VDA277 standards. GC/MS measurements were performed using an Agilent 7890A GC and an Agilent 5975C VL MSD. The column was an HP-5MS column with a length of 30 m, inner diameter of 0.25 mm, and film thickness of 0.25 μm. Helium was used as the carrier gas with a 0.7 mL/min flow rate. Samples were heated at 120° C. for 120 minutes incubation time with a 1 mL injection.

Injection molding: Tensile bars to ASTM dimensions were injected molded on a Cincinnati Milacron injection molder. Total cycle time was 45 seconds with a mold temperature of 140° F.

Flexural modulus measurements: Flexural modulus measurements were performed on an Instron AT3 test system. The measurements were carried out in accordance with ASTM D790 standards with a load cell of 100 lbf, test speed of 0.05 in/min, 2 inches span distance, and a temperature of 72° F.

Izod impact strength measurements: Izod impact strength measurements were performed on a Tinius Olsen impact tester. The measurements were carried out in accordance with ASTM D256 standards at 72° F.

What is claimed is:

1. A process for modifying an olefin polymer composition, comprising:

melt mixing an olefin polymer composition with a free-radical initiator composition comprising a peroxide-modified inorganic composition prepared from:

i) a liquid or an aqueous hydrogen peroxide, and ii) one or more inorganic solid particles, wherein the inorganic solid particles have affinity to the hydrogen peroxide through hydrogen bonding, wherein the peroxide-modified inorganic composition initiates a free-radical reaction of the olefin polymer composition to produce a modified olefin polymer composition.

2. The process of claim 1, wherein the olefin polymer composition is a petroleum-based virgin resin, bio-based resin, recycled resin, or combinations thereof.

3. The process of claim 1, wherein the peroxide-modified inorganic composition comprises a hydrogen-bonding interaction between hydrogen peroxide and the inorganic solid particles such that the hydrogen peroxide is adsorbed on a surface of the inorganic solid particles.

4. The process of claim 1, wherein the olefin polymer composition comprises a propylene-based polymer, an ethylene-based polymer, an ethylene-vinyl ester polymer, a $C_4$-$C_{12}$ olefin-based polymer, a styrene-based polymer, polyacrylate, or combinations thereof.

5. The process of claim 4, wherein the olefin polymer composition further comprises a polyamide, nylon, ethylene-vinyl alcohol, polyester, or combinations thereof.

6. The process of claim 1, wherein the olefin polymer composition comprises at least 51 wt % of a propylene-based polymer, an ethylene-based polymer, or a combination thereof.

7. The process of claim 6, wherein the propylene-based polymer is selected from the group consisting of a homopolymer, random copolymer, heterophasic copolymer, random heterophasic copolymer, terpolymer, and combinations thereof.

8. The process of claim 6, wherein the ethylene-based polymer is selected from the group consisting of low-density polyethylene, linear low-density polyethylene, high-density polyethylene, medium-density polyethylene, polyethylene wax, ultrahigh-molecular weight polyethylene, ethylene copolymer, and combinations thereof.

9. The process of claim 1, wherein the inorganic solid particles are selected from the group consisting of metal oxides, metal salts, metalloids, silicon based materials, graphene or graphene oxide, inorganic persalts, clays, minerals, and combinations thereof.

10. The process of claim 1, wherein the inorganic solid particles are one or more metal oxides.

11. The process of claim 10, wherein the metal oxide is selected from the group consisting of an alkali metal oxide, an alkaline earth metal oxide, a transition metal oxide, a lanthanide metal oxide, and combinations thereof.

12. The process of claim 10, wherein the metal oxide is zinc oxide, titanium oxide, cerium oxide, zirconium oxide, yttrium oxide, nickel oxide, iron oxide, copper oxide, magnesium oxide, bismouth oxide, aluminum oxide, molybdenum oxide, tungsten oxide, niobium oxide, vanadium oxide, or cobalt oxide, or mixtures thereof.

13. The process of claim 10, wherein the metal oxide is a mixed metal oxide containing more than one metallic elements in the metal oxide.

14. The process of claim 1, wherein the free-radical initiator composition further comprises an additional inorganic peroxide.

15. The process of claim 14, wherein the inorganic peroxide is a metal peroxide or metal persalt.

16. The process of claim 14, wherein the inorganic peroxide is a metal peroxide selected from the group consisting of an alkali metal peroxide, an alkaline earth metal peroxide, a transition metal peroxide, a lanthanide metal peroxide, and combinations thereof.

17. The process of claim 14, wherein the inorganic peroxide is an inorganic persalt is preferably selected from the group consisting of a metal perborate, a metal percarbonate, a metal persulfate, a metal perchlorate, a metal perphosphate, and combinations thereof.

18. The process of claim 1, wherein the free-radical initiator composition is added in an amount ranging from about 0.01 wt % to about 15 wt %.

19. The process of claim 18, wherein the free-radical initiator composition is added in an amount ranging from about 0.01 wt % to about 10 wt %.

20. The process of claim 1, wherein the free-radical initiator composition further comprises an organic peroxide.

21. The process of claim 1, wherein the process does not involve an organic peroxide.

22. The process of claim 1, further comprising adding a metal stearate selected from the group consisting of zinc stearate, tin stearate, iron (II) stearate, iron (III) stearate, cobalt stearate, manganese stearate, and combinations thereof.

23. The process of claim 1, wherein the melt mixing step is carried out at a temperature that decomposes the hydrogen peroxide on the surface of the inorganic solid particles.

24. The process of claim 1, wherein the melt mixing step is carried out at a temperature above the melting point of the olefin polymer composition.

25. The process of claim 1, wherein the melt mixing step is carried out at a temperature wherein a chain scission reaction occurs, producing the modified olefin polymer composition having a reduced melt viscosity, and/or reduced molecular weight.

26. The process of claim 25, wherein:

the olefin polymer composition comprises at least 51 wt % of a propylene-based polymer, an ethylene-based polymer, or a combination thereof, and the melt mixing step is carried out at a temperature at about 350° C. or greater.

27. The process of claim 25, wherein:

the olefin polymer composition comprises at least 51 wt % of a propylene-based polymer, and the melt mixing step is carried out at a temperature at about 170° C. or greater.

28. The process of claim 25, wherein:
the olefin polymer composition comprises at least 51 wt % of an ethylene-based polymer, and
the melt mixing step is carried out at a temperature at about 350° C. or greater.

29. The process of claim 1, wherein the melt mixing step is carried out at a temperature wherein a crosslinking or chain branching reaction occurs.

30. The process of claim 29, wherein:
the olefin polymer composition comprises at least 51 wt % of an ethylene-based polymer, and
the melt mixing step is carried out at a temperature lower than about 350° C.

31. The process of claim 1, further comprising, prior to or during the melt mixing, adding a grafting agent comprising one or more functional groups selected from the group consisting of carboxyl, anhydride, epoxy, hydroxyl, amino, amide, imide, ester, silane, alkoxysilane, acid halide group, aromatic ring, nitrile group, and combinations thereof.

32. The process of claim 1, further comprising, prior to or during the melt mixing, adding an additional polymer composition selected from the group consisting of a propylene-based polymer, an ethylene-based polymer, an ethylene-vinyl ester polymer, a $C_4$-$C_{12}$ olefin-based polymer, a styrene-based polymer, and combinations thereof.

33. The process of claim 32, wherein the melt mixing step is carried out at a temperature wherein a grafting reaction occurs, producing the modified olefin polymer composition having functional groups or additional polymeric units grafted in the polymer chains.

34. The process of claim 1, wherein the melt mixing step is carried out by extrusion.

35. The process of claim 1, where the melt mixing step is carried out at a residence time of 2 minutes or less.

36. A modified olefin polymer composition prepared by a process comprising:
melt mixing an olefin polymer composition with a free-radical initiator composition comprising a peroxide-modified inorganic composition prepared from:
i) a liquid or an aqueous hydrogen peroxide, and
ii) one or more inorganic solid particles, wherein the inorganic solid particles have affinity to the hydrogen peroxide through hydrogen bonding,
wherein the peroxide-modified inorganic composition initiates a free-radical reaction of the olefin polymer composition to produce a modified olefin polymer composition.

37. The modified olefin polymer composition of claim 36, wherein the modified olefin polymer composition has i) an increased melt flow index and ii) an increased or retained mechanical strength, as compared to an unmodified olefin polymer composition.

38. The modified olefin polymer composition of claim 37, wherein the modified olefin polymer composition has an increase in melt flow index of at least 75% fold and an increase in flexural modulus of at least 5%, as compared to an unmodified olefin polymer.

39. The modified olefin polymer composition of claim 37, wherein the modified olefin polymer composition has an increase in melt flow index of at least 75% fold and no more than 10% decrease in flexural modulus, as compared to an unmodified olefin polymer.

40. The modified olefin polymer composition of claim 37, wherein the modified olefin polymer composition has an increase in melt flow index of at least 75% and no more than 20% decrease in Izod impact strength, as compared to an unmodified olefin polymer.

41. The modified olefin polymer composition of claim 36, wherein the modified olefin polymer composition has a reduced VOC content of at least 5%, as compared to the unmodified olefin polymer composition.

42. The modified olefin polymer composition of claim 36, wherein the modified olefin polymer composition has an added VOC content of no more than 6 fold, as compared to the unmodified olefin polymer composition.

43. The modified olefin polymer composition of claim 36, wherein the composition is in a form of solid, wax, liquid, volatile, or a combination thereof.

44. A molded article, fiber, filament, film, melt blown fabric, additive manufacture feedstock, or chemical recycling feedstock formed from the modified olefin polymer composition of claim 36.

45. The chemical recycling feedstock of claim 44, wherein the chemical recycling feedstock is employed in a chemical recycling process selected from the group consisting of pyrolysis, thermal or catalytic depolymerization, hydrogenation, hydrocraking, oxycracking, gasification, and hydrothermal liquefaction.

* * * * *